US012581074B2

(12) United States Patent
Huang et al.

(10) Patent No.: US 12,581,074 B2
(45) Date of Patent: Mar. 17, 2026

(54) CHROMA COMPONENT CODING

(71) Applicant: QUALCOMM Incorporated, San Diego, CA (US)

(72) Inventors: Han Huang, San Diego, CA (US); Vadim Seregin, San Diego, CA (US); Marta Karczewicz, San Diego, CA (US); Hongtao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/732,460

(22) Filed: Jun. 3, 2024

(65) Prior Publication Data

US 2024/0430420 A1     Dec. 26, 2024

Related U.S. Application Data

(60) Provisional application No. 63/584,403, filed on Sep. 21, 2023, provisional application No. 63/509,732, filed on Jun. 22, 2023.

(51) Int. Cl.
*H04N 19/119* (2014.01)
*H04N 19/176* (2014.01)
*H04N 19/186* (2014.01)
*H04N 19/96* (2014.01)

(52) U.S. Cl.
CPC ......... *H04N 19/119* (2014.11); *H04N 19/176* (2014.11); *H04N 19/186* (2014.11); *H04N 19/96* (2014.11)

(58) Field of Classification Search
CPC .... H04N 19/11; H04N 19/117; H04N 19/119; H04N 19/176; H04N 19/186; H04N 19/593; H04N 19/70; H04N 19/96
See application file for complete search history.

(56) References Cited

U.S. PATENT DOCUMENTS

| 2021/0185321 A1* | 6/2021 | Liao | H04N 19/96 |
| 2022/0132134 A1* | 4/2022 | Koo | H04N 19/132 |
| 2022/0166998 A1* | 5/2022 | Lim | H04N 19/46 |

(Continued)

OTHER PUBLICATIONS

Bross B., et al., "Versatile Video Coding Editorial Refinements on Draft 10", 20. JVET Meeting, Teleconference, (The Joint Video Exploration Team of ISO/IEC JTC1/SC29/WG11 and ITU-T SG.16), No. JVET-T2001-v2, Oct. 7-Oct. 16, 2020, Nov. 24, 2020, pp. 1-511, XP030293334, sections 8.6 to 8.6.2.5.

(Continued)

*Primary Examiner* — Md N Haque
(74) *Attorney, Agent, or Firm* — Shumaker & Sieffert, P. A.

(57) ABSTRACT

Devices and methods are described for coding a chroma block of video data. An example device includes one or more memories configured to store the video data. The device includes one or more processors in communication with the one or more memories. The one or more processors are configured to determine that single-tree block partitioning is used on a block of the video data. The one or more processors are configured to apply an intra chroma copy mode to a chroma block of the block. The one or more processors are configured to encode or decode the chroma block based on single-tree block partitioning and the intra chroma copy mode.

19 Claims, 15 Drawing Sheets

(56) References Cited

U.S. PATENT DOCUMENTS

| | | | |
|---|---|---|---|
| 2022/0182662 A1* | 6/2022 | Kang ................... | H04N 19/503 |
| 2022/0224890 A1* | 7/2022 | Lin ......................... | H04N 19/70 |
| 2022/0256189 A1* | 8/2022 | Lee ......................... | H04N 19/52 |

OTHER PUBLICATIONS

Huang H (Qualcomm)., et al., "AHG12: On the Chroma DBV Mode", 31. JVET Meeting, Geneva, (The Joint Video Exploration Team of ISO/IEC JTC1/SC29/WG11 and ITU-T SG.16), No. JVET-AE0098-v2, Jul. 11-Jul. 19, 2023, Jul. 12, 2023, 4 Pages, XP030311311, the whole document.

Huo J., et al., "Non-EE2: Direct Block Vector (DBV) Mode for Chroma Prediction", 28. JVET Meeting, MAINZ, (The Joint Video Exploration Team of ISO/IEC JTC1/SC29/WG11 and ITU-T SG.16), No. JVET-AB0094-v1, m60856, Oct. 21-Oct. 28, 2022, Oct. 14, 2022, 3 Pages, XP030304549, the whole document.

International Search Report and Written Opinion—PCT/US2024/032371—ISA/EPO—Sep. 25, 2024 14 Pages.

Astola P., et al., "AHG12: Convolutional Cross-Component Model (CCCM) For Intra Prediction", JVET-Z0064-v1, Joint Video Experts Team (JVET) of ITU-T SG16 WP3 and ISO/IEC JTC1/SC29/WG11, 26. JVET Meeting, by Teleconference, Apr. 20-29, 2022, pp. 1-5.

Astola P., et al., "EE2-1.1a: Convolutional Cross-component Intra Prediction Model", JVET-AA0057-v1, Joint Video Experts Team (JVET) of ITU-T G 16 WP 3 and ISO/IEC JTC 1/SC 29, 27th Meeting, by Teleconference, Jul. 13-22, 2022, pp. 1-4.

Coban M., et al., "Algorithm Description of Enhanced Compression Model 8 (ECM 8)", JVET-AC2025, Joint Video Experts Team (JVET) of ITU-T SG 16 WP 3 and ISO/IEC JTC 1/SC 29, 29th Meeting, by teleconference, Jan. 11-20, 2023, pp. 1-74, JVET-AC2025-v1.

Huang H., et al., "AHG12: On the Chroma DBV Mode", Joint Video Experts Team (JVET) of ITU-T SG 16 WP 3 and ISO/IEC JTC 1/SC 29 31st Meeting, Geneva, CH, Jul. 11-19, 2023, JVET-AE0098-V3, pp. 1-4.

Huang H., et al., "EE2: Test 2.9 Enable DBV in Single Tree", Joint Video Experts Team (JVET) of ITU-T SG 16 WP 3 and ISO/IEC JTC 1/SC 29 32nd Meeting, Hannover, DE, Oct. 13-20, 2023, JVET-AF0066-V2, pp. 1-2.

Huo J., et al., "EE2-1.15a: Intra Template Matching (Intra TMP) Based on Linear Filter Model", Xidian University, JVET-AD0112-v3, Joint Video Experts Team (JVET) of ITU-T SG 16 WP 3 and ISO/IEC JTC 1/SC 29 30th Meeting, Antalya, TR, Apr. 21-28, 2023, pp. 1-3.

Huo J., et al., "EE2-1.16: A Fusion method of Intra Template Matching Prediction(Intra TMP)", Xidian University, JVET-AD0116-v2, Joint Video Experts Team (JVET) of ITU-T SG 16 WP 3 and ISO/IEC JTC 1/SC 29 30th Meeting, Antalya, TR, Apr. 21-28, 2023, pp. 1-4.

Huo J., et al., "EE2-3.1: Direct Block Vector Mode for Chroma Prediction", JVET-AC0071-v1, Joint Video Experts Team (JVET) of ITU-T SG 16 WP 3 and ISO/IEC JTC 1/SC 2929th Meeting, by Teleconference, Jan. 11-20, 2023, pp. 1-4.

Huo J., et al., "Non-EE2: A Fusion Method of Intra Template Matching Prediction(Intra TMP)", Joint Video Experts Team (JVET) of ITU-T SG 16 WP 3 and ISO/IEC JTC 1/SC 29/WG11 and Itu-T SG.16, 29th Meeting, by Teleconference, Jan. 11-20, 2023, No. JVET-AC0110-v2, m61688, Jan. 12, 2023, 3 Pages, XP030306646, the whole document.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Kidani Y., et al., "Non-EE2: Bi-Predictive IBC for Natural and Screen Content", JVET-AD0134-v3, Joint Video Experts Team (JVET) of ITU-T SG 16 WP 3 and ISO/IEC JTC 1/SC 29 30th Meeting, Antalya, TR, Apr. 21-28, 2023, pp. 1-5.

Li X., et al., "EE2-1.12: Intra TMP with sub-pel Precision", Alibaba group, JVET-AD0125-v1, Joint Video Experts Team (JVET) of ITU-T SG 16 WP 3 and ISO/IEC JTC 1/SC 29 30th Meeting, Antalya, TR, Apr. 21-28, 2023, pp. 1-3.

Youvalari R.G., et al., "AHG12: Block Vector Guided CCCM", Joint Video Experts Team (JVET) of ITU-T SG 16 WP 3 and ISO/IEC JTC 1/SC 29, 30th Meeting, Antalya, TR, Apr. 21-28, 2023, JVET-AD0100-v2, pp. 1-5.

Yu Y., et al., "EE2-2.9: Extended Search Areas for IntraTMP Mode", Joint Video Experts Team (JVET) of ITU-T SG 16 WP 3 and ISO/IEC JTC 1/SC 29 31st Meeting, Geneva, CH, Jul. 11-19, 2023, JVET-AE0077-v1, pp. 1-4.

Zhang K., et al., "Enhanced Cross-Component Linear Model Intra-Prediction", JVET-D0110, Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0110-v3, pp. 1-6.

Zhang L., et al., "EE2-1.11: Intra Template Matching Prediction Fusion", JVET-AD0072-v2, Joint Video Experts Team (JVET) of ITU-T SG 16 WP 3 and ISO/IEC JTC 1/SC 29, 30th Meeting, Apr. 21-Apr. 28, 2023, Antalya, TR, Apr. 17, 2023, pp. 1-5, XP030308662.

Zhang L (Oppo)., et al., "Non-EE2: Intra Template-Matching Prediction Fusion", JVET-AC0069-v2, Joint Video Experts Team (JVET) of ITU-T SG 16 WP 3 and ISO/IEC JTC 1/SC 29, 29th Meeting, by Teleconference, Jan. 11-Jan. 20, 2023, No. JVET-AC0069, m61638, Jan. 13, 2023, pp. 1-5, XP030306545, The Whole Document.

* cited by examiner

600

EXTENSIONS
704

REFERENCE AREA
702

PU
700

800

| NW | N | NE |
|----|---|----|
| W | C | E |
| SW | S | SE |

CHROMA COMPONENT CODING

This application claims the benefit of U.S. Provisional Patent Application 63/584,403, filed on Sep. 21, 2023, and U.S. Provisional Patent Application 63/509,732, filed Jun. 22, 2023, the entire content of both of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for chroma component coding. In some video standards and implementations, some chroma coding modes are only enabled when block partitioning is dual-tree partitioning (e.g., chroma has a separate partitioning tree which might be different than a corresponding luma block partitioning tree). Such a restriction may prevent the use of more efficient coding modes. This disclosure describes techniques including the use of such chroma coding modes when a block may be partitioned using single-tree partitioning. These techniques may improve the efficiency of video coding thereby reducing power consumption, reducing bandwidth required to transmit encoded video data, and/or improving video coding quality.

In one example, a method includes determining that single-tree block partitioning is used on a block of the video data; applying an intra chroma copy mode to a chroma block of the block; and encoding or decoding the chroma block based on single-tree block partitioning and the intra chroma copy mode.

In another example, a device includes one or more memories configured to store video data and one or more processors in communication with the one or more memories and configured to determine that single-tree block partitioning is used on a block of the video data; apply an intra chroma copy mode to a chroma block of the block; and encode or decode the chroma block based on single-tree block partitioning and the intra chroma copy mode.

In another example, a device includes means for determining that single-tree block partitioning is used on a block of the video data; means for applying an intra chroma copy mode to a chroma block of the block; and means for encoding or decoding the chroma block based on single-tree block partitioning and the intra chroma copy mode.

In another example, a computer-readable storage medium is encoded with instructions that, when executed, cause one or more programmable processors to determine that single-tree block partitioning is used on a block of the video data; apply an intra chroma copy mode to a chroma block of the block; and encode or decode the chroma block based on single-tree block partitioning and the intra chroma copy mode.

The details of one or more examples are set forth in the accompanying drawings and the description below. Other features, objects, and advantages will be apparent from the description, drawings, and claims.

DETAILED DESCRIPTION

In general, this disclosure describes techniques for chroma component coding. In some video standards and implementations, some chroma coding modes are only enabled when block partitioning is dual-tree partitioning (e.g., chroma has a separate partitioning tree which might be different than a corresponding luma block partitioning tree). Such a restriction may prevent the use of more efficient coding modes. This disclosure describes techniques including the use of such chroma coding modes when a block may be partitioned using single-tree partitioning. The techniques disclosed herein may save processing power, reduce bandwidth used to transmit encoded video data, and/or improve coding performance (e.g., improve image quality of encoded and decoded video data).

Figure 1:
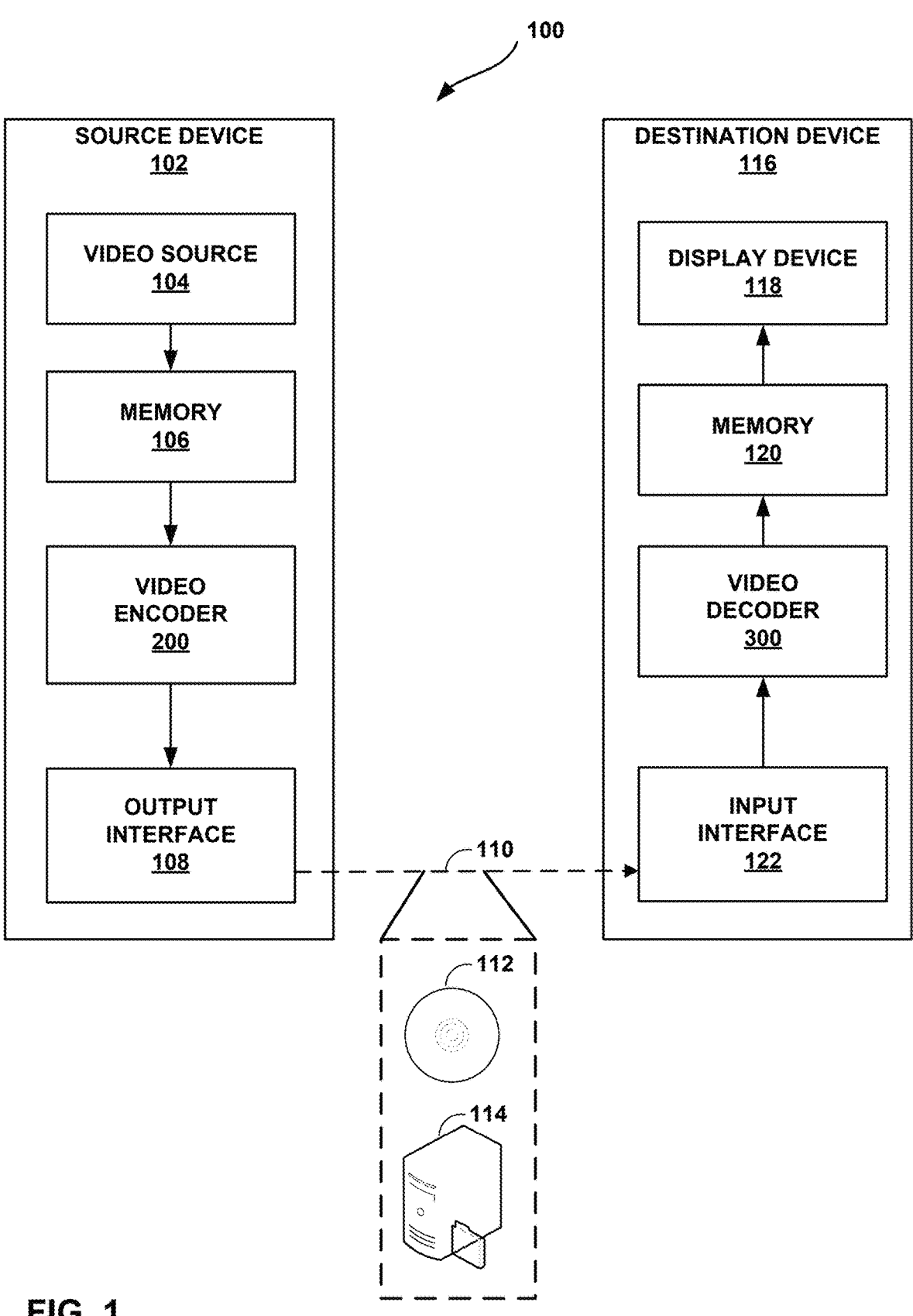
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for chroma component coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for chroma component coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use chroma component coding.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, a method includes determining that single-tree block partitioning is used on a block of the video data; applying an intra chroma copy mode to a chroma block of the block; and encoding or decoding the chroma block based on single-tree block partitioning and the intra chroma copy mode.

Figure 2:
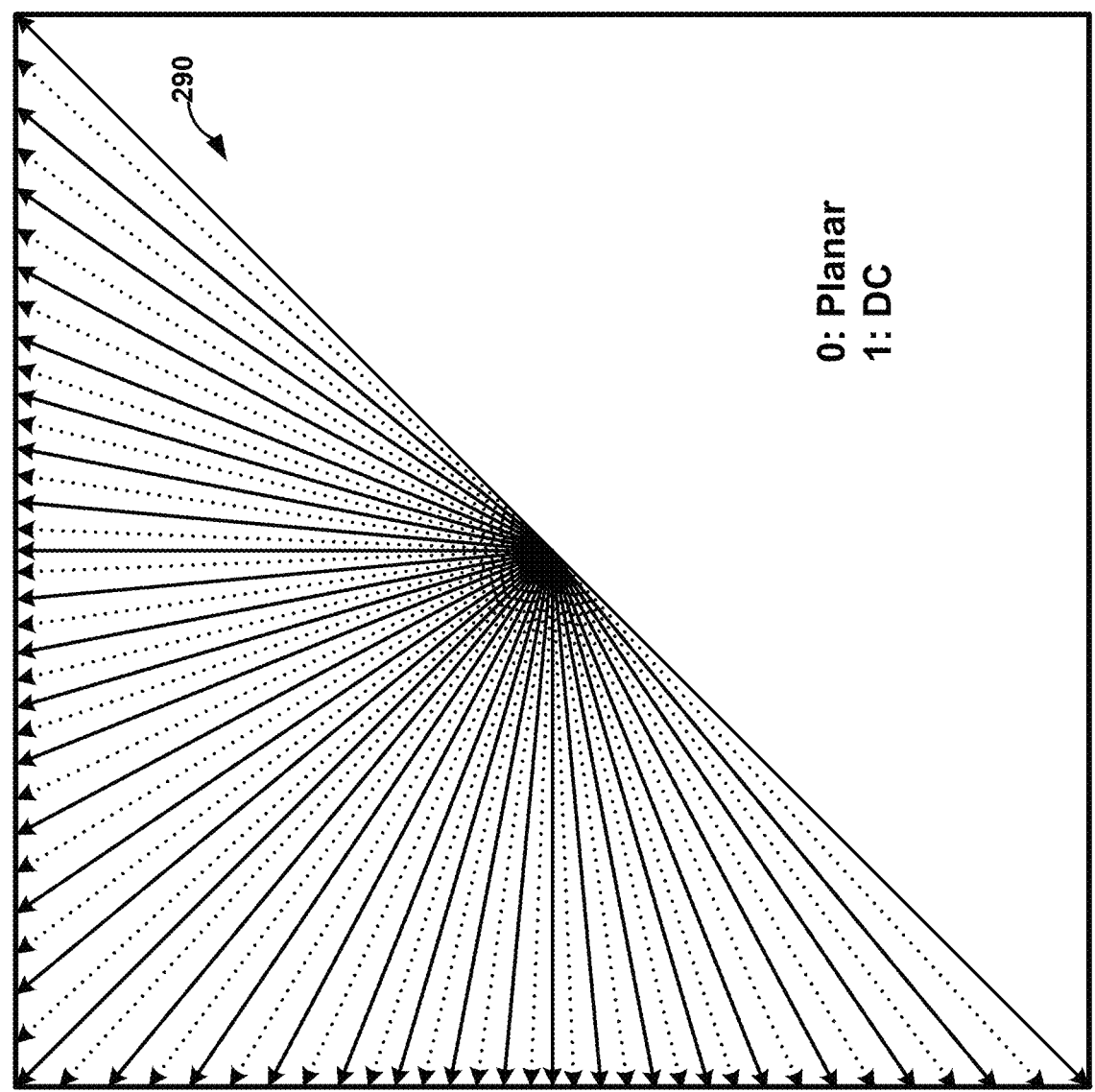
FIG. 2 is a conceptual diagram illustrating an example of intra prediction modes.

FIG. 2 is a conceptual diagram illustrating an example of intra prediction modes. Chroma intra prediction in the Versatile Video Coding (VVC) standard is now described, including intra mode coding with 67 intra prediction modes 290. To capture arbitrary edge directions presented in natural video, the number of directional intra modes in VVC is extended from 33, as used in HEVC, to 65. The new directional modes not in HEVC are depicted as dotted lines with arrows in FIG. 2, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for non-square blocks. Wide-angle intra prediction is described later in this disclosure.

In HEVC, every intra-coded block has a square shape and the length of each side of the square shape is a power of 2. Thus, no division operations are required to generate an intra-predictor using DC mode. In VVC, blocks can have a rectangular shape that necessitates the use of a division operation per block in the general case. To avoid division operations for DC prediction, only the longer side of a rectangular shape is used to compute an average for non-square blocks.

Wide-angle intra prediction for non-square blocks is now described. Conventional angular intra prediction directions are defined from 45 degrees to −135 degrees in a clockwise direction. In VVC, several conventional angular intra prediction modes are adaptively replaced with wide-angle intra prediction modes for non-square blocks. The replaced modes are signaled using the original mode indexes, which are remapped to the indexes of wide angular modes after parsing. For example, video encoder 200 may signal the replaced modes to video decoder 300. The total number of intra prediction modes is unchanged, i.e., 67, and the intra mode coding method is unchanged.

Figure 3:
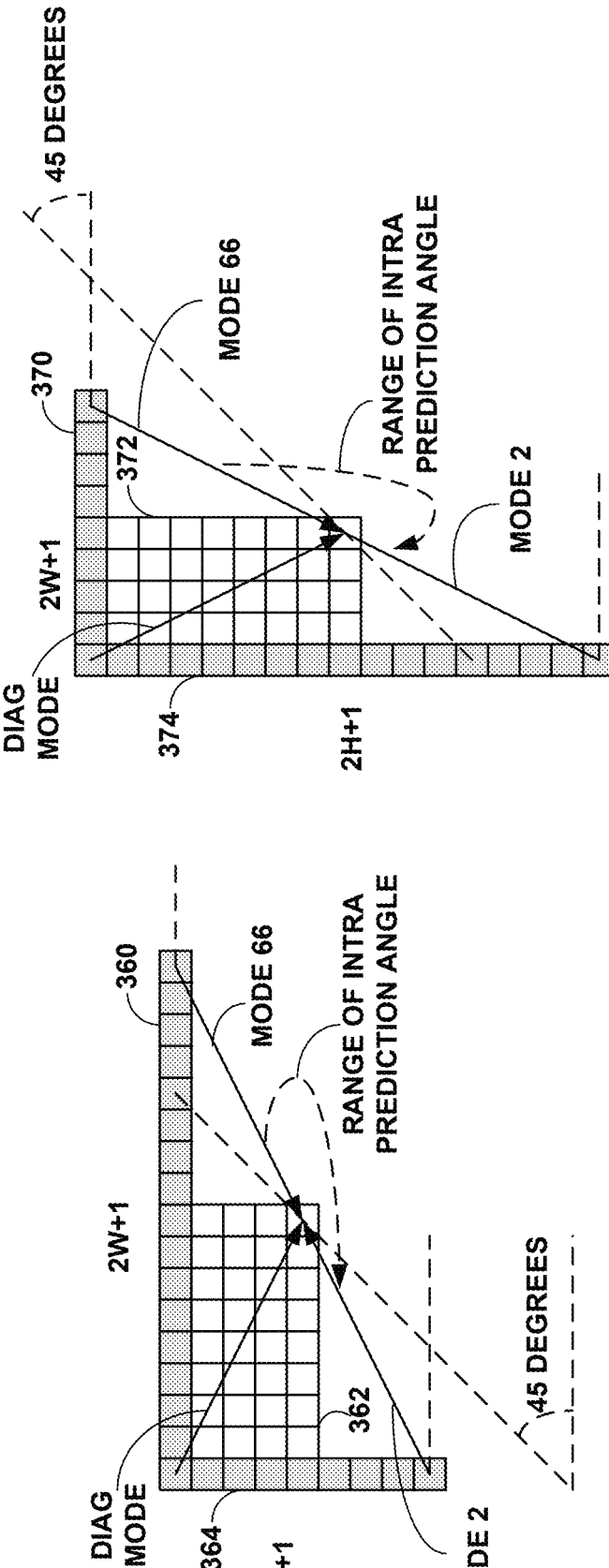
FIG. 3 is a conceptual diagram illustrating example reference samples for wide-angular intra prediction.

FIG. 3 is a conceptual diagram illustrating example reference samples for wide-angular intra prediction. To support these prediction directions, the top reference with length 2 W+1, and the left reference with length 2 H+1, are defined as shown in FIG. 3. For example, top reference 360 has a length of two times as many samples plus one sample (2×8 samples+1 sample=17 samples) as a width of rectangular block 362 (8 samples). Similarly, top reference 370 has a length of two times as many samples plus one sample (2×4 samples+1 sample=9 samples) as a width of rectangular block 372 (4 samples). For example, left reference 364 has a length of two times as many samples plus one sample (2×4 samples+1 sample=9 samples) as a height of rectangular block 362 (4 samples). Similarly, left reference 374 has a length of two times as many samples plus one sample (2×8 samples+1 sample=17 samples) as a height of rectangular block 372 (8 samples).

The number of replaced modes in wide-angular direction mode depends on the aspect ratio of a block (e.g., a ratio of width/height). The replaced intra prediction modes are set forth in Table 1.

TABLE 1

Intra prediction modes replaced by wide-angular modes

| Aspect ratio | Replaced intra prediction modes |
|---|---|
| W/H = 16 | Modes 2, 3, 4, 5, 6, 7, 8, 9, 10, 11, 12, 13, 14, 15 |
| W/H = 8 | Modes 2, 3, 4, 5, 6, 7, 8, 9, 10, 11, 12, 13 |
| W/H = 4 | Modes 2, 3, 4, 5, 6, 7, 8, 9, 10, 11 |
| W/H = 2 | Modes 2, 3, 4, 5, 6, 7, 8, 9 |
| W/H = 1 | None |
| W/H = 1/2 | Modes 59, 60, 61, 62, 63, 64, 65, 66 |
| W/H = 1/4 | Mode 57, 58, 59, 60, 61, 62, 63, 64, 65, 66 |
| W/H = 1/8 | Modes 55, 56, 57, 58, 59, 60, 61, 62, 63, 64, 65, 66 |
| W/H = 1/16 | Modes 53, 54, 55, 56, 57, 58, 59, 60, 61, 62, 63, 64, 65, 66 |

Figure 4:
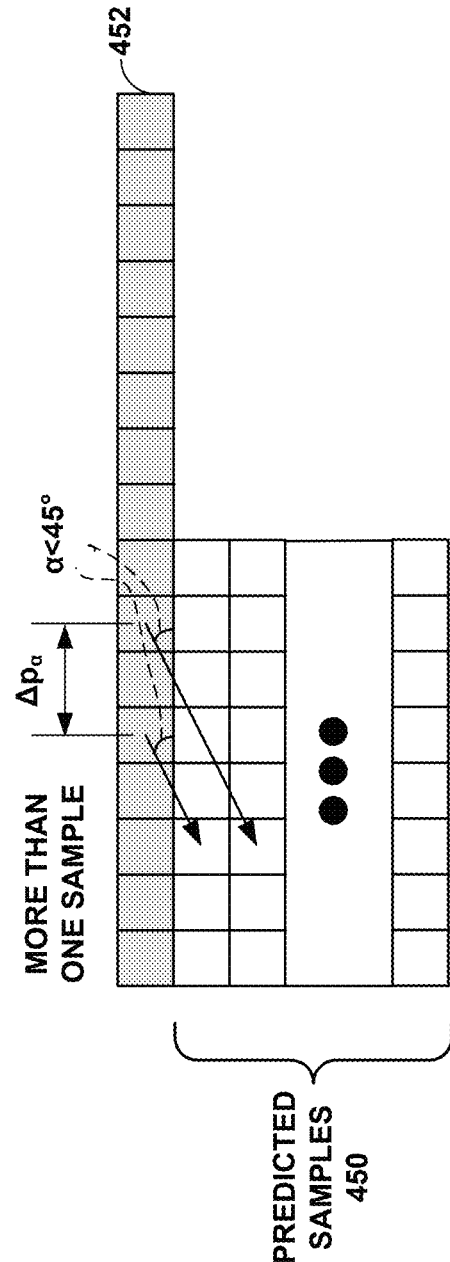
FIG. 4 is a conceptual diagram illustrating an example of discontinuity in the case of directions beyond 45 degrees.

FIG. 4 is a conceptual diagram illustrating an example of discontinuity in the case of directions beyond 45 degrees. As shown in FIG. 4, two vertically-adjacent predicted samples of predicted samples 450 may use two non-adjacent reference samples of reference samples 452 in the case of wide-angle intra prediction. Hence, low-pass reference sample filtering and side smoothing may be applied to the wide-angle prediction to reduce the negative effect of the increased gap Apa, for example, if a wide-angle mode represents a non-fractional offset. For example, video encoder 200 or video decoder 300 may apply such filtering and smoothing. There are 8 modes of the wide-angle modes that satisfy this condition, which are [−14, −12, −10, −6, 72, 76, 78, 80]. When a block is predicted using any of these modes, the samples in the reference buffer are directly copied without applying any interpolation. With this modification, the number of samples needed to be smoothed is reduced. Moreover, such techniques align the design of non-fractional modes with the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since the HEVC specification does not support prediction angles below −135 degrees or above 45 degrees, luma intra prediction modes ranging from 2 to 5 may be mapped to 2. Therefore, chroma DM derivation table for 4:2:2 chroma format is updated by replacing some values of the entries of the mapping table to convert the prediction angle more precisely for chroma blocks.

Cross-component linear model prediction is now described. To reduce the cross-component redundancy, a cross-component linear model (CCLM) prediction mode may be used in VVC, for which the chroma samples are predicted based on the reconstructed luma samples of the same CU by using a linear model as follows:

$$pred_C(i, j) = \alpha \cdot rec'_L(i, j) + \beta$$

where $pred_C(i,j)$ represents the predicted chroma samples in a CU and $rec_L(i,j)$ represents the downsampled reconstructed luma samples of the same CU.

The CCLM parameters ($\alpha$ and $\beta$) are derived with neighboring chroma samples and their corresponding downsampled luma samples. For example, video encoder 200 or video decoder 300 may derive the CCLM parameters.

Figure 5:
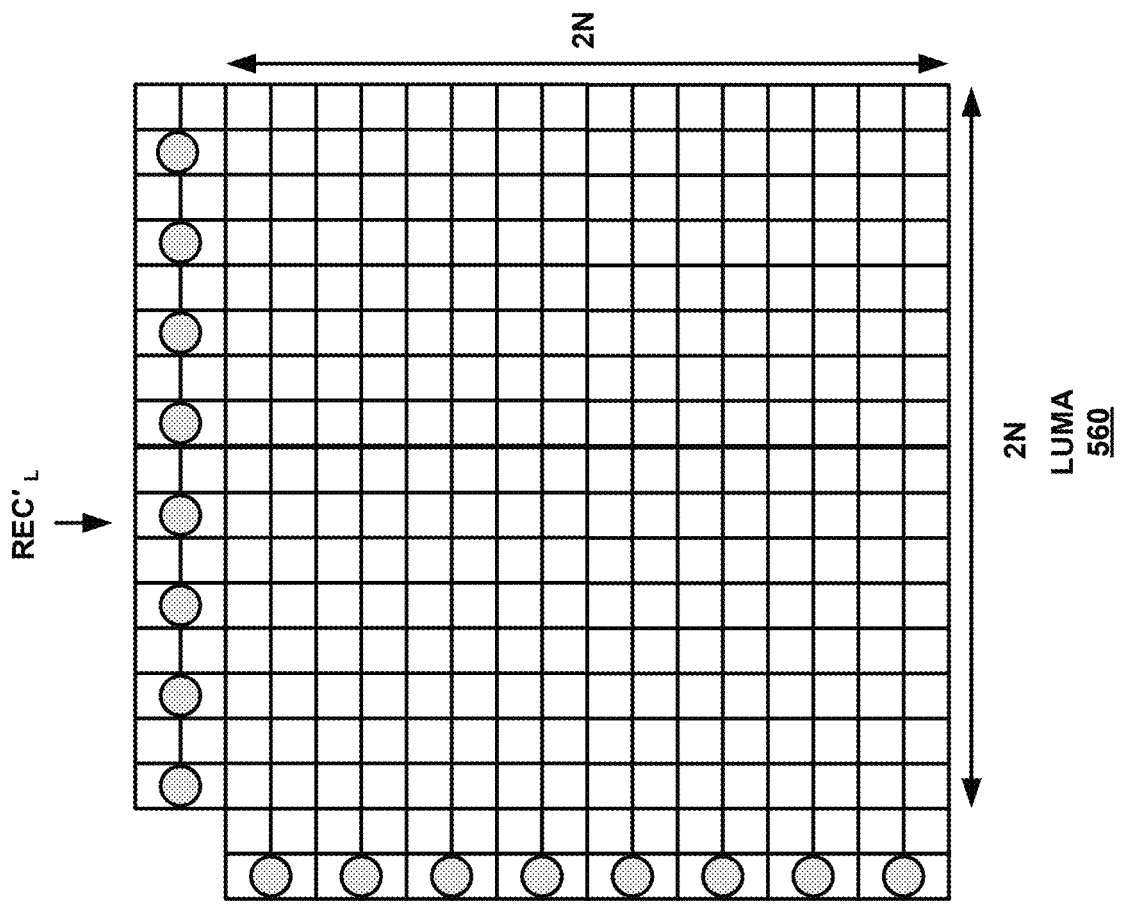
FIG. 5 is a conceptual diagram illustrating example location of samples for the use in derivation of $\alpha$ and $\beta$.
Figure 5:
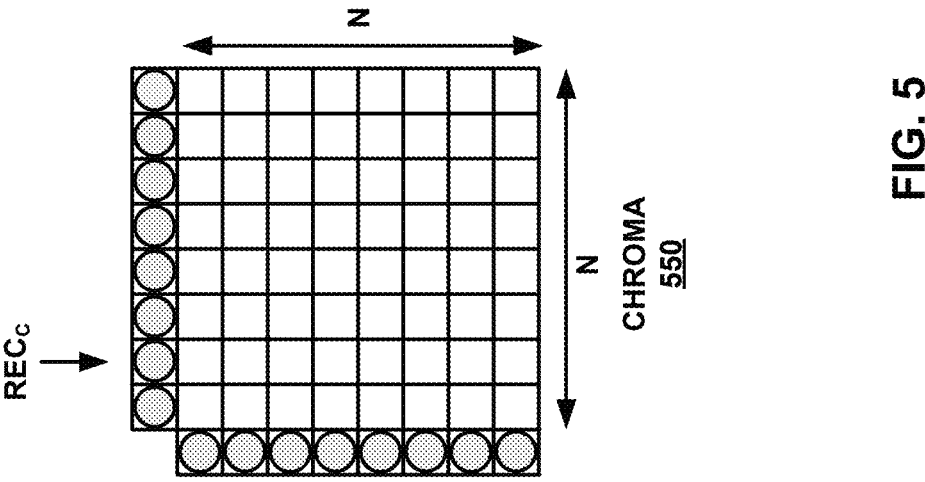

FIG. 5 is a conceptual diagram illustrating example location of samples for the use in derivation of $\alpha$ and $\beta$. FIG. 5 shows an example of the location of the left and above samples for the sample of the current block involved in the CCLM mode. For example, for chroma block 550 a corresponding block of reconstructed luma samples, 560 is shown. Video encoder 200 or video decoder 300 may use the samples shown in circles for determining $\alpha$ and $\beta$.

The above template and left template may be used to calculate the linear model coefficients together. The above template and/or left template may also be used alternatively in the other two linear model (LM) modes, called LM_A, and LM_L modes.

In LM_T mode, only the above template is used to calculate the linear model coefficients. To get more samples, the above template may be extended to (W+H) samples. In LM_L mode, only the left template is used to calculate the linear model coefficients. To get more samples, the left template may be extended to (H+W) samples. In LM_LT mode, the left and above templates are used to calculate the linear model coefficients. For example, video encoder 200 or video decoder 300 may use the above template, the left template, or both the above template and left template as described.

To match the chroma sample locations for 4:2:0 video sequences, two types of downsampling filters are applied to luma samples to achieve a 2 to 1 downsampling ratio in both the horizontal and vertical directions. The selection of the downsampling filter is specified by a SPS level flag. For example, video encoder 200 may signal an SPS level flag indicating which downsampling filter video decoder 300 should apply.

Chroma intra mode coding is now described. Video encoder 200 or video decoder 300 may use chroma intra mode coding. For chroma intra mode coding, a total of 8 intra modes are allowed for chroma intra mode coding. Those modes include five traditional intra modes and three cross-component linear model modes (CCLM, LM_A, and LM_L). The chroma mode signaling and derivation process is shown in Table 2. Chroma mode coding may directly depend on the intra prediction mode of the corresponding luma block. Since separate block partitioning structure for luma and chroma components is enabled in I slices, one chroma block may correspond to multiple luma blocks. Therefore, for chroma DM mode, the intra prediction mode of the corresponding luma block covering the center position of the current chroma block may be directly inherited.

TABLE 2

| Chroma prediction mode | Corresponding luma intra prediction mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

Derivation of chroma prediction mode from luma mode when cclm is enabled.

A single binarization table is used regardless of the value of sps_cclm_enabled_flag as shown in Table 3.

TABLE 3

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 3, the first bin indicates whether the mode is regular (0) or an LM mode (1). If the mode is an LM mode, then the next bin indicates whether the mode is LM_CHROMA (0) or not. If the mode is not LM_CHROMA, the next bin indicates whether the mode is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both the sps_cclm_enabled_flag equal to 0 and 1 cases. The first two bins in Table 3 may be context coded with their own context model, and the rest bins may be bypass coded.

Intra block copy is now described. Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder (e.g., video encoder 200) to find the optimal block vector (or motion vector) for each CU. Here, a block vector is used to indicate the displacement from the current block to a reference block, which is already reconstructed inside the current picture.

IBC in VVC is now described. The luma block vector of an IBC-coded CU is in integer precision. The chroma block vector rounds to integer precision as well. When combined with advanced motion vector resolution (AMVR), the IBC mode can switch between 1-pel and 4-pel motion vector precisions.

Video encoder may signal an IBC mode as follows. For example, at a CU level, IBC mode may be signaled with a flag and may be signaled as IBC advanced motion vector prediction (AMVP) mode or IBC skip/merge mode as follows: 1) IBC skip/merge mode: a merge candidate index is used to indicate which of the block vectors in the list from neighboring candidate IBC coded blocks is used to predict the current block. The merge list may include spatial, history-based motion vector predictor (HMVP), and/or pairwise candidates. 2) IBC AMVP mode: a block vector difference is coded in the same way as a motion vector difference. The block vector prediction technique uses two candidates as predictors, one from the left neighbor and one from the above neighbor (if IBC coded). When either neighbor is not available, a default block vector may be used as a predictor. A flag is signaled to indicate the block vector predictor index.

The interaction between IBC mode and other inter coding tools in VVC, such as pairwise merge candidate, HMVP, combined intra/inter prediction mode (CIIP), merge mode with motion vector difference (MMVD), and geometric partitioning mode (GPM) are as follows: 1) IBC can be used with pairwise merge candidate and HMVP. A new pairwise IBC merge candidate can be generated by averaging two IBC merge candidates. For HMVP, IBC motion is inserted into history buffer for future referencing. 2) IBC cannot be used in combination with the following inter tools: affine motion, CIIP, MMVD, and GPM. 3) IBC is not allowed for the chroma coding blocks when DUAL_TREE partition is used.

Unlike in the HEVC screen content coding extension, the current picture is no longer included as one of the reference pictures in the reference picture list 0 for IBC prediction. The derivation process of motion vectors for IBC mode excludes all neighboring blocks in inter mode and vice versa. The following IBC design aspects are applied: 1) IBC shares the same process as in regular MV merge mode including with pairwise merge candidate and history based motion predictor, but disallows temporal motion vector prediction (TMVP) and zero vector because they are invalid for IBC mode; 2) A separate HMVP buffer (5 candidates each) is used for a conventional motion vector (MV) and IBC; 3) Block vector constraints are implemented in the form of bitstream conformance constraint(s), video encoder 200 ensures that no invalid vectors are present in the bitstream, and merge mode shall not be used if the merge candidate is invalid (e.g., out of range or 0). Such a bitstream conformance constraint is expressed in terms of a virtual buffer as described below; 4) For deblocking, IBC is handled as inter mode; 6) If the current block is coded using IBC prediction mode, AMVR does not use quarter-pel; instead, AMVR is signaled to only indicate whether an MV is inter-pel or 4 integer-pel; and/or 7) The number of IBC merge candidates can be signaled in the slice header separately from the numbers of regular, subblock, and geometric merge candidates.

IntraTMP in ECM is now described. In the Enhanced Compression Model (ECM), there is yet another intra block copy mode other than IBC, named intra template matching prediction (IntraTMP).

Intra template matching prediction is a special intra prediction mode that copies the best prediction block from the reconstructed part of the current frame, whose L-shaped template matches the current template. For a predefined search range, video encoder 200 searches for the most similar template to the current template in a reconstructed part of the current frame and uses the corresponding block as a prediction block. Video encoder 200 then signals the usage of this mode, and the same prediction operation is performed at video decoder 300.

The prediction signal is generated by matching the L-shaped causal neighbor of the current block with another block in a predefined search area. A sum of absolute differences (SAD) is used as a cost function.

Within each region, video decoder 300 searches for the template that has a least SAD with respect to the current template and uses the corresponding block of the template having the least SAD as a prediction block.

An intra template matching tool is enabled for CUs with size less than or equal to 64 in width and height. This maximum CU size for intra template matching is configurable.

The intra template matching prediction mode is signaled at CU level through a dedicated flag when decoder-side intra mode derivation (DIMD) is not used for current CU. For example, video encoder 200 may signal such a dedicated flag to video decoder 300.

New chroma intra prediction modes in Enhanced Compression Model (ECM) is now described. Multi-model LM (MMLM) is first described. Cross-component linear model (CCLM) included in VVC is extended by adding three MMLM modes. Sec, e.g., Zhang, et al. "Enhanced Cross-component Linear Model Intra-prediction," Joint Video Experts Team (JVET) of ITU-T SG 16 WP 3 and ISO/IEC JTC 1/SC 29/WG 11, 4th Meeting: Chengdu, CN, 15-21 Oct. 2016, JVET-D0110. In each MMLM mode, the reconstructed neighboring samples are classified into two classes using a threshold which is the average of the luma reconstructed neighboring samples. The linear model of each class is derived using the Least-Mean-Square (LMS) method. For the CCLM mode, the LMS method is also used to derive the linear model. Video encoder 200 or video decoder 300 may use the CCLM mode or MMLM mode.

Slope adjustment of CCLM is now described. A slope adjustment to is applied to CCLM and to MMLM prediction. For example, video encoder 200 or video decoder 300 may perform the slope adjustment. The adjustment includes tilting the linear function which maps luma values to chroma values with respect to a center point determined by the average luma value of the reference samples.

CCLM uses a model with 2 parameters to map luma values to chroma values. The slope parameter "$\alpha$" and the bias parameter "$\beta$" define the mapping as follows:

$$pred_C(i, j) = \alpha \cdot rec'_L(i, j) + \beta$$

An adjustment "u" to the slope parameter is signaled to update the model to the following form:

$$pred_C(i, j) = \alpha' \cdot rec'_L(i, j) + \beta$$

where $$\alpha' = \alpha + u$$

$$b' = b - u \cdot y_r$$

With this selection the mapping function is tilted or rotated around the point with luminance value $\gamma_r$. The average of the reference luma samples used in the model creation as $\gamma_r$ in order to provide a meaningful modification to the model.

Video encoder 200 or video decoder 300 may provide a slope adjustment parameter. A slope adjustment parameter is provided as an integer between −4 and 4, inclusive, and is signaled in the bitstream (e.g., by video encoder 200). The unit of the slope adjustment parameter is $\frac{1}{8}^{th}$ of a chroma sample value per one luma sample value (for 10-bit content).

Adjustment is available for the CCLM models that are using reference samples of above and left of the block, but not for the "single side" modes (LM_A, LM_L). This selection is based on coding efficiency versus complexity trade-off considerations.

When a slope adjustment is applied for a multimode CCLM model, both models can be adjusted and thus up to two slope updates may be signaled for a single chroma block. For example, video encoder 200 may determine and signal up to two slope updates to video decoder 300.

A convolutional cross-component model is now described. In Astola, et al. "AHG12: Convolutional cross-component model (CCCM) for intra prediction," Joint Video Experts Team (JVET) of ITU-T SG 16 WP 3 and ISO/IEC JTC 1/SC 29/WG 11, 26th Meeting: by Teleconference, 20-29 Apr. 2022, JVET-Z0064 and Astola, et al., "EE2-1.1a: Convolutional cross-component intra prediction model," Joint Video Experts Team (JVET) of ITU-T SG 16 WP 3 and ISO/IEC JTC 1/SC 29/WG 11, 27th Meeting: by Teleconference, 13-22 Jul. 2022, JVET-AA0057, it was proposed to apply convolutional cross-component model (CCCM) to predict chroma samples from reconstructed luma samples in a similar spirit as is performed by the CCLM modes. As with CCLM, the reconstructed luma samples are down-sampled to match the lower resolution chroma grid when chroma sub-sampling is used. Video encoder 200 or video decoder 300 may utilize the CCCM techniques and/or the CCLM techniques.

Also, similarly to CCLM, there is an option of using a single model or multi-model variant of CCCM. The multi-model variant uses two models, one model derived for samples above the average luma reference value and another model for the rest of the samples (following the spirit of the CCLM design). Multi-model CCCM mode can be selected for PUs which have at least 128 reference samples available.

Figure 6:
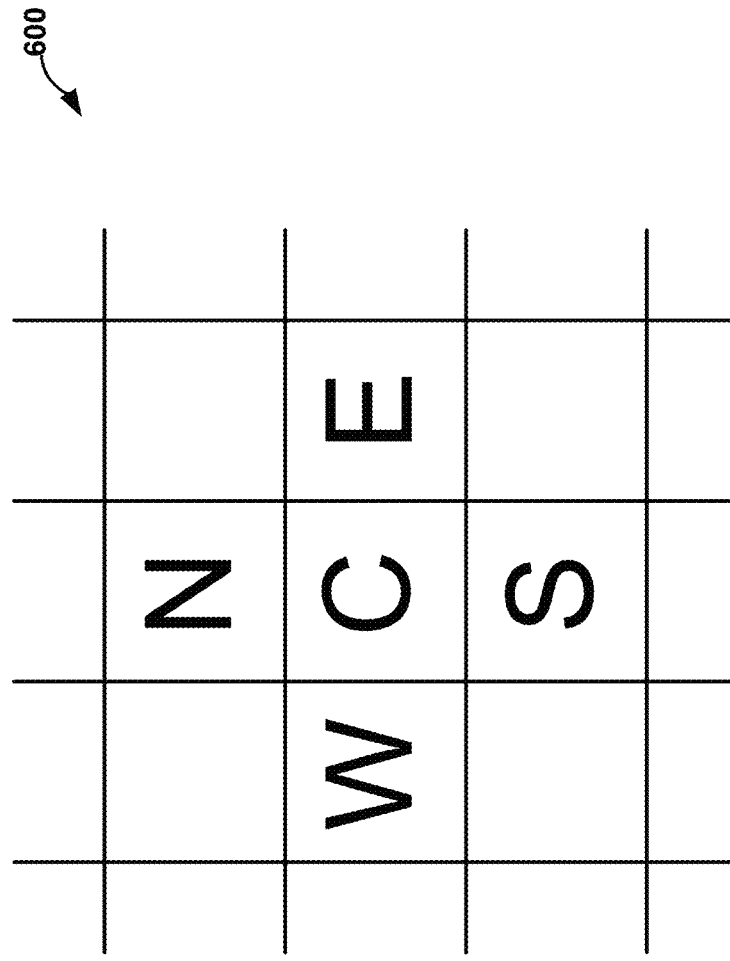
FIG. 6 is a conceptual diagram illustrating an example spatial part of a convolution filter.

FIG. 6 is a conceptual diagram illustrating an example spatial part of a convolution filter. The convolutional 7-tap filter consists of a 5-tap plus sign-shaped spatial component (referred to herein as "spatial 5-tap component 600"), a nonlinear term, and a bias term. The input to spatial 5-tap component 600 of the filter consists of a center (C) luma sample which is co-located with the chroma sample to be predicted and its above/north (N), below/south(S), left/west (W) and right/east (E) neighbors as illustrated in FIG. 6. Video encoder 200 or video decoder 300 may apply the convolutional 7-tap filter.

The nonlinear term P is represented as power of two of the center luma sample C and scaled to the sample value range of the content:

$$P = (C * C + midVal) >> bitDepth$$

That is, for 10-bit content it is calculated as:

$$P = (C * C + 512) >> 10$$

The bias term B represents a scalar offset between the input and output (similarly to the offset term in CCLM) and is set to middle chroma value (512 for 10-bit content).

The output of the filter is calculated as a convolution between the filter coefficients $c_i$ and the input values and clipped to the range of valid chroma samples:

$$predChromaVal = c_0C + c_1N + c_2S + c_3E + c_4W + c_5P + c_6B$$

Figure 7:
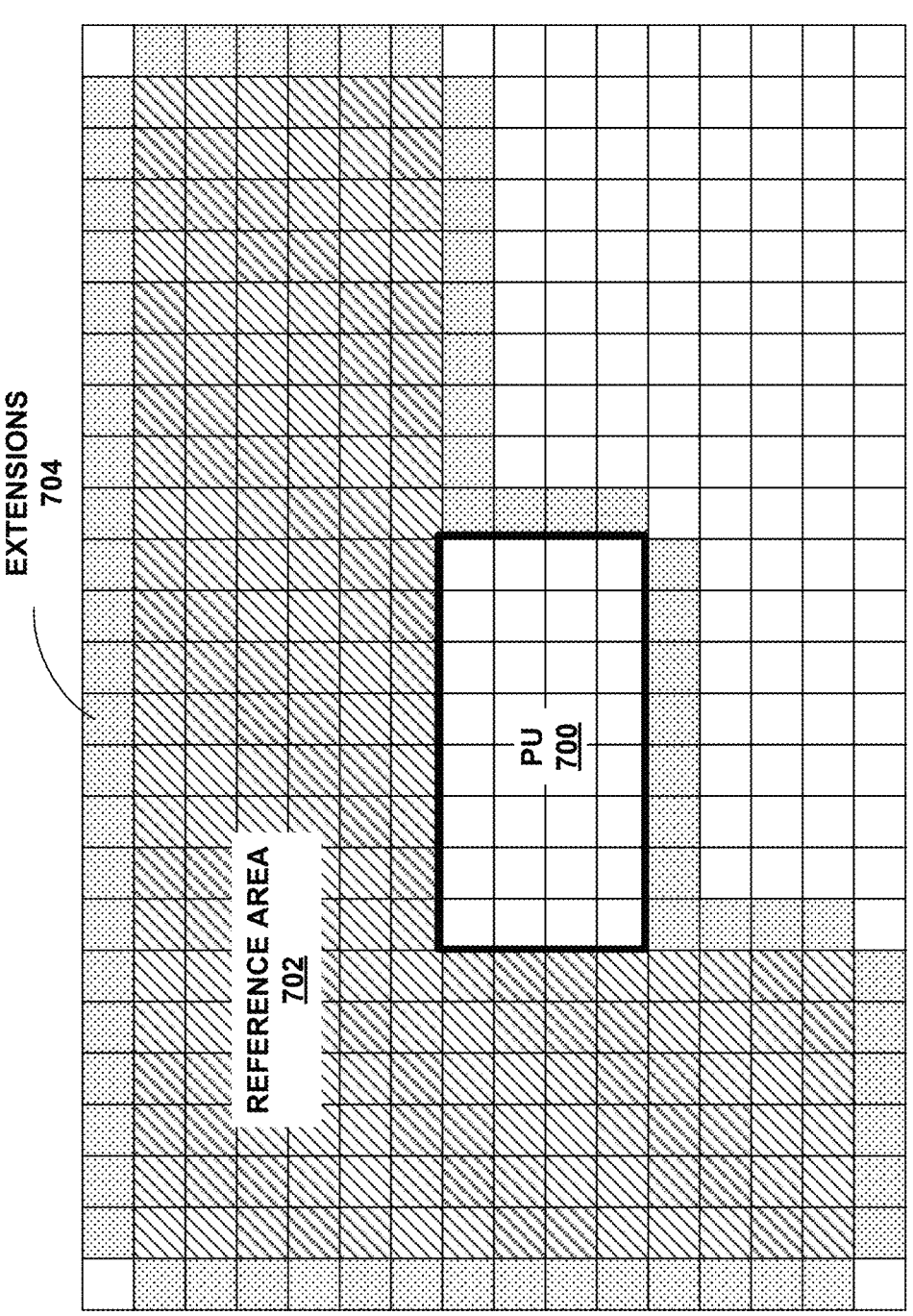
FIG. 7 is a conceptual diagram illustrating an example reference area (with padding) used to derive filter coefficients.

FIG. 7 is a conceptual diagram illustrating an example reference area (with padding) used to derive filter coefficients. The filter coefficients ci are calculated by minimizing a mean squared error (MSE) between predicted and reconstructed chroma samples in a reference area 702 (represented by the slash filled boxes) for PU 700. FIG. 7 illustrates reference area 702 which includes of 6 lines of chroma samples above and left of PU 700. Reference area 702 extends (via extensions 704 shown in boxes with a dotted fill) one PU width to the right and one PU height below the PU boundaries of PU 700. Reference area 702 may be adjusted to include only available samples. Extensions 704 to reference area 702 are used to support the "side samples" of the plus shaped spatial filter and are padded when in unavailable areas.

The MSE minimization is performed by calculating autocorrelation matrix for the luma input and a cross-correlation vector between the luma input and chroma output. An autocorrelation matrix is LDL decomposed and the final filter coefficients are calculated using back-substitution. The process follows roughly the calculation of the adaptive linear filter (ALF) filter coefficients in ECM, however LDL decomposition was chosen instead of Cholesky decomposition to avoid using square root operations. The proposed approach uses only integer arithmetic.

Figure 8:
FIG. 8 is a conceptual diagram illustrating example spatial samples for GL-CCCM.

Gradient and location-based CCCM (GL-CCCM) is now described. FIG. 8 is a conceptual diagram illustrating example spatial samples for GL-CCCM. Video encoder 200 or video decoder 300 may utilize spatial samples 800 when performing the GL-CCCM technique shown in FIG. 8.

The GL-CCCM technique uses gradient and location information instead of the 4 spatial neighbor samples in the CCCM filter. The GL-CCCM filter for the prediction is:

$$predChroma\ Val = c_0C + c_1G_y + c_2G_x + c_3Y + c_4X + c_5P + c_6B$$

Where $G_y$ and $G_x$ are the vertical and horizontal gradients, respectively, and are calculated as:

$$G_y = (2N + NW + NE) - (2S + SW + SE)$$
$$G_x = (2W + NW + SW) - (2E + NE + SE)$$

Moreover, the Y and X parameters are, in some examples, the vertical and horizontal locations of the center luma sample.

The rest of the parameters may be the same as for the CCCM tool. The reference area for the parameter calculation is the same as CCCM technique.

A gradient linear model is now described. For YUV 4:2:0 color format, a gradient linear model (GLM) technique can be used to predict the chroma samples from luma sample gradients. Two modes are supported: a two-parameter GLM mode and a three-parameter GLM mode. Video encoder 200 or video decoder 300 may utilize the GLM techniques.

Compared with the CCLM mode, instead of down-sampled luma values, the two-parameter GLM mode utilizes luma sample gradients to derive the linear model. Specifically, when the two-parameter GLM mode is applied, the input to the CCLM process, i.e., the down-sampled luma samples L, are replaced by luma sample gradients G. The other parts of the CCLM mode (e.g., parameter derivation, prediction sample linear transform) are kept unchanged. Thus, with the two-parameter GLM mode, video encoder 200 or video decoder 300 may determine a predictor of a chroma sample, C, using the luma sample gradient G, the slope parameter $\alpha$, and the bias parameter $\beta$, as:

$$C = \alpha \cdot G + \beta$$

In the three-parameter GLM mode, a chroma sample can be predicted based on both the luma sample gradients and down-sampled luma values with different parameters. The model parameters of the three-parameter GLM mode are derived from 6 rows and columns of adjacent samples via the LDL decomposition based MSE minimization technique as used in the CCCM. For example, with the three-parameter GLM mode, video encoder 200 or video decoder 300 may determine a predictor of a chroma sample as:

$$C = \alpha_0 \cdot G + \alpha_1 \cdot L + \alpha_2 \cdot \beta$$

where C is the predictor of the chroma sample, G is the luma sample gradient, L is a down-sampled luma sample, $\alpha_0$ is a first slope parameter, $\alpha_1$ is a second slope parameter, $\alpha_2$ is a third slope parameter, and $\beta$ is the bias parameter.

Direct block vector mode for chroma prediction is now described. Video encoder 200 or video decoder 300 may utilize direct block vector mode for chroma prediction. In Huo, et al., "EE2-3.1: Direct block vector mode for chroma prediction," Joint Video Experts Team (JVET) of ITU-T SG 16 WP 3 and ISO/IEC JTC 1/SC 29/WG 11, 29th Meeting: by Teleconference, 11-20 Jan. 2023, JVET-AC0071, a direct block vector (DBV) is described to improve the coding efficiency for chroma components when dual tree is activated in an intra slice. This technique describes or includes two implementations.

Figure 9:
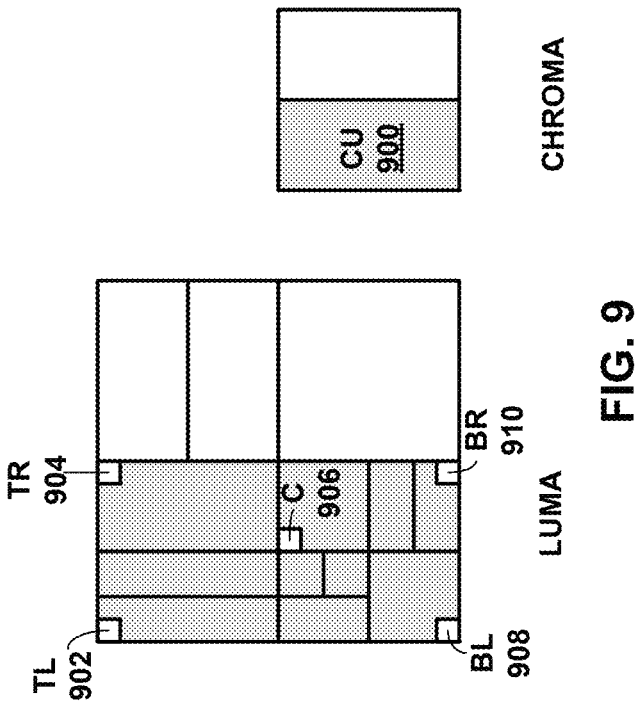
FIG. 9 is a conceptual diagram illustrating an example of 5 locations in reconstructed luma samples.

FIG. 9 is a conceptual diagram illustrating an example of 5 locations in reconstructed luma samples. When chroma dual tree is activated in an intra slice, for a chroma CU 900 coded with DBV mode, if one of the luma blocks in five locations shown in FIG. 9, namely, top left 902, top right 904, center 906, bottom left 908, or bottom right 910, is coded with IBC mode or IntraTmp mode, the luma block vector bvL is used to derive chroma block vector bvC.

Block vector guided CCCM (BVG-CCCM) is now described. Video encoder 200 or video decoder 300 may utilize BVG-CCCM.

In Youvalari, et al., "AHG12: Block vector guided CCCM," Joint Video Experts Team (JVET) of ITU-T SG 16 WP 3 and ISO/IEC JTC 1/SC 29/WG 11, 30th Meeting: Antalya, TR, 21-28 Apr. 2023, JVET-AD0100, a BVG-CCCM technique is proposed for improving the coding efficiency of ECM. The BVG-CCCM technique uses a block vector of the co-located luma block, coded in IBC or intraTMP mode, to determine the reference area for calculating the CCCM parameters. Then the reference area in luma, and a corresponding area in a chroma channel, is used to calculate the CCCM parameters. The prediction uses the calculated model parameters and co-located luma samples to do the CCCM prediction.

Figure 10:
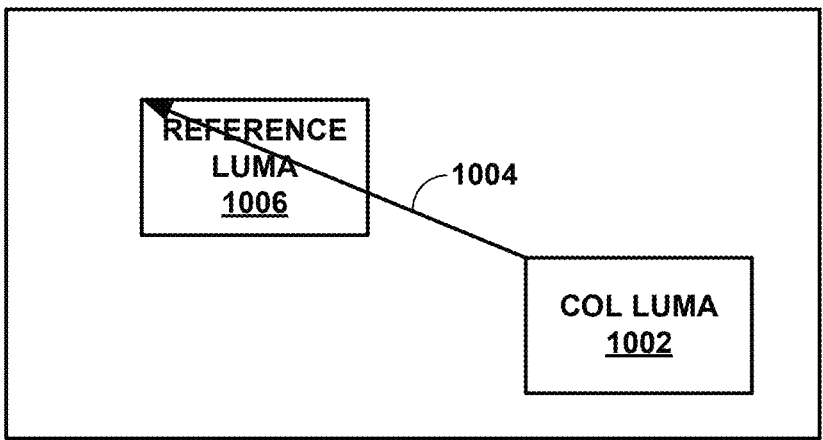
FIG. 10 is a conceptual diagram illustrating an example reference area for BVG-CCCM.
Figure 10:
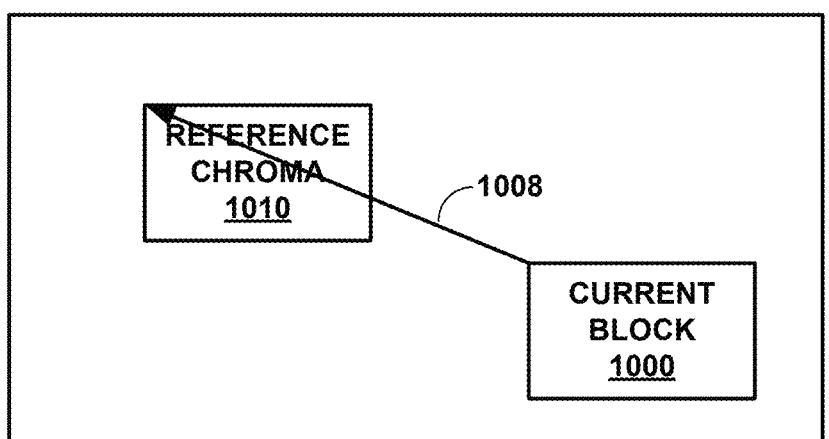

FIG. 10 is a conceptual diagram illustrating an example reference area for BVG-CCCM. For example, co-located luma block 1002 may be co-located with current block 1000. Current block 1000 may be a chroma block corresponding to co-located luma block 1002. Video encoder 200 or video decoder 300 may use block vector 1004 of co-located luma block 1002, coded in IBC or intraTMP mode, to determine the reference area (e.g., reference chroma 1010) for calculating the CCCM parameters. For example, video encoder 200—or video decoder 300 may determine a block vector 1008 corresponding to block vector 1004 to determine reference area (e.g. reference chroma 1010). Then the reference area in luma (e.g., reference luma 1006), and a corresponding area in a chroma channel (e.g., reference chroma 1010), may be used to calculate the CCCM parameters. The prediction uses the calculated model parameters and co-located luma samples when performing CCCM prediction.

Similar to Direct Block Vector (DBV) mode in ECM-8.0, five locations in a co-located luma block area (e.g., of co-located luma block 1002) are scanned for determining the block vector to be used in BVG-CCCM technique. Usage of the BVG-CCCM mode is signaled with a CABAC coded PU level flag. For example, video encoder 200 may signal the use of BVG-CCCM mode to video decoder 300 via a BVG-CCCM flag at a PU level. The BVG-CCCM flag is signaled if co-located luma block 1002 is coded in IBC or intraTMP modes and the cross-component index is LM_CHROMA_IDX or MMLM_CHROMA_IDX.

In ECM, DBV mode is only enabled when block partitioning uses dual-tree (e.g., chroma has a separate partitioning tree which might be different than a corresponding luma block partitioning tree). In the case of single-tree block partitioning, when IntraTMP is used for coding a luma block, chroma coding modes can be chosen from regular intra prediction modes and cross-component prediction modes. For example, video encoder 200 or video decoder 300 may choose between regular intra prediction modes and cross-component prediction modes when coding a chroma block having single-tree partitioning when IntraTMP is used to code the corresponding luma block. However, in such a case, a video coder (e.g., video encoder 200 or video decoder 300) does not have the option of intra block copy (IBC) mode. Cross-component prediction modes include CCLM, MMLM, CCCM, GLM, and other modes that predict chroma samples from luma samples.

According to the techniques of this disclosure, an intra chroma copy mode is enabled in single-tree block partitioning, such as a DBV mode. For example, an intra chroma copy mode, in one example a DBV mode, in single-tree block partitioning is enabled. In one example, this mode may be enabled when a corresponding luma block has a block vector, which may happen, for example, when the corresponding luma block is coded using IntraTMP or IBC. Video encoder 200 or video decoder 300 may utilize an intra chroma copy mode, such as DBV mode, while using single-tree block partitioning.

In one example, the DBV mode is indicated by the same flag as in the dual-tree partitioning case, and is signaled as a separate mode. A separate context from the dual-tree DBV case may be used to signal a DBV flag in a single tree case. In one example, the contexts to signal a DBV flag may be shared for single and dual tree cases. Video encoder 200 may signal the flag(s) and video decoder 300 may parse the flag(s) to determine whether to use DBV mode.

In another example, the DBV mode is implicitly applied in the single-tree partitioning case when chroma coding utilizes DM mode. In some examples, video encoder 200 may signal a flag to video decoder 300 to indicate that chroma is coded utilizing DM mode. If the luma block has a block vector, for example, when the block is coded by IntraTMP or IBC, DM mode indicates DBV mode, otherwise, DM mode indicates the regular intra prediction mode. In such a case, video encoder 200 may not signal a DBV flag and video decoder 300 may implicitly determine whether to apply DBV mode, rather than parsing a DBV flag.

In yet another example, if the luma block is coded by IntraTMP or IBC mode in single tree partitioning, the chroma mode coding is forced to be DBV mode. For example, if video encoder 200 or video decoder 300 codes the luma block using IntraTMP mode or IBC mode with single tree partitioning, video encoder 200 or video decoder 300 will use the DBV mode to code the corresponding chroma block. As such, the syntax elements to indicate other modes (regular intra prediction modes and cross-component prediction modes) are not signaled in the bitstream, because those syntax elements are not needed. In such examples, video encoder 200 may not signal syntax elements to indicate other modes and video decoder 300 may not parse such elements.

In yet another example, if a luma block has a block vector, for example, if the block is coded by IntraTMP or IBC mode in single tree partitioning, the chroma mode coding is forced to be DBV mode or one of the cross-component prediction modes, and, in such a case, the regular intra prediction modes may be disabled. Therefore, the corresponding syntax element to indicate regular intra prediction modes may be saved such that they may not be signaled in the bitstream. For example, video encoder 200 does not signal the corresponding syntax element to indicate regular intra prediction modes and video decoder 300 may not parse the corresponding syntax element when the luma block, in single tree partitioning, has a block vector.

In yet another example, if a luma block has a block vector, for example if the block is coded by IntraTMP or IBC mode in single tree partitioning, whether the chroma mode coding is forced to be DBV mode is controlled by a high level syntax (e.g., SPS level flag, picture header, or slice header). For example, video encoder 200 may signal, in high level syntax, a syntax element indicating whether the chroma mode coding is forced to be DBV mode. Video decoder 300 may parse the syntax element to determine whether chroma mode coding is forced to be DBV mode for such blocks to which the syntax element is applicable.

In Zhang, et al., "Non-EE2: Intra Template-Matching Prediction Fusion," Joint Video Experts Team (JVET) of ITU-T SG 16 WP 3 and ISO/IEC JTC 1/SC 29/WG 11, 29th Meeting: by Teleconference, 11-20 Jan. 2023, JVET-AC0069; Huo, et al., "Non-EE2: A Fusion method of Intra Template Matching Prediction (Intra TMP)," Joint Video Experts Team (JVET) of ITU-T SG 16 WP 3 and ISO/IEC JTC 1/SC 29/WG 11, 29th Meeting: by Teleconference, 11-20 Jan. 2023, JVET-AC0110; Zhang, et al., "EE2-1.11: Intra template matching prediction fusion," Joint Video Experts Team (JVET) of ITU-T SG 16 WP 3 and ISO/IEC JTC 1/SC 29/WG 11, 30th Meeting: Antalya, TR, 21-28 Apr. 2023, JVET-AD0072; and Huo, et al., "EE2-1.16: A Fusion method of Intra Template Matching Prediction (Intra TMP)," Joint Video Experts Team (JVET) of ITU-T SG 16 WP 3 and ISO/IEC JTC 1/SC 29/WG 11, 30th Meeting:

Antalya, TR, 21-28 Apr. 2023, JVET-AD0116, IntraTMP fusion modes were disclosed, wherein the luma intra predictor is generated by blending multiple reference blocks derived from multiple BVs from an intra template matching process. Huo, et al., "EE2-1.15a: Intra template matching (Intra TMP) based on linear filter model," Joint Video Experts Team (JVET) of ITU-T SG 16 WP 3 and ISO/IEC JTC 1/SC 29/WG 11, 30th Meeting: Antalya, TR, 21-28 Apr. 2023, JVET-AD0112, disclosed applying linear filtering to the luma IntraTMP predictor, wherein the 6-tap linear filter includes 5 spatial luma samples in the reference block and a bias term. Filter coefficients may be derived by minimizing the MSE on samples between the reference template (obtained by the block vector) and a current template. In Li, et al., "EE2-1.12: Intra TMP with sub-pel precision," Joint Video Experts Team (JVET) of ITU-T SG 16 WP 3 and ISO/IEC JTC 1/SC 29/WG 11, 30th Meeting: Antalya, TR, 21-28 Apr. 2023, JVET-AD0125, subpel precision IntraTMP was disclosed, three sub-pel precisions, including half-pel, quarter-pel and three quarter-pel, with eight directions around the integer-pel position are supported. In Kidani, et al., "Non-EE2: Bi-predictive IBC for natural and screen content," Joint Video Experts Team (JVET) of ITU-T SG 16 WP 3 and ISO/IEC JTC 1/SC 29/WG 11, 30th Meeting: Antalya, TR, 21-28 Apr. 2023, JVET-AD0134, bi-predictive IBC was disclosed. However, the behavior of chroma DBV mode (which borrows a block vector from some co-located luma block) is undefined. This disclosure also describes different techniques for the chroma DBV mode.

In one example, when a luma block uses IntraTMP fusion, video encoder 200 or video decoder 300 using chroma DBV mode also generates a predictor by blending multiple reference blocks obtained from the same set of BVs that are used in luma IntraTMP fusion.

In another example, when a luma block uses linear filtering, the same filter is applied to the chroma DBV predictor. For example, video encoder 200 or video decoder 300 may apply the same filter used for linear filtering to the chroma DBV predictor.

In yet another example, when a luma block uses linear filtering, a linear filter is applied to the chroma DBV predictor. The linear filter is derived by minimizing the MSE on chroma samples between the reference template identified by the block vector and current template. For example, video encoder 200 or video decoder 300 may derive a linear filter by minimizing MSE on chroma samples between the reference template identified by the block vector and current template and applying the derived linear filter to the chroma BVD predictor. In yet another example, if the luma block has multiple block vectors (for example, bi-predicted IBC and IntraTMP fusion), only one block vector is used for chroma block copy. Therefore, no weighted prediction or fusion is applied in DBV mode to limit the computational complexity of the mode. For example, video encoder 200 or video decoder 300 may not apply weighted prediction or fusion in DBV mode. In one example, the selected block vector is the one stored in list 0. In another example, the selected block vector is the first block vector in luma IntraTMP (with the lowest template matching cost).

In yet another example, if a filtering process is applied to the corresponding luma block, the filtering process is not applied to the chroma coding to reduce the complexity. For example, video encoder 200 or video decoder 300 may not apply a filtering technique to chroma block if a filtering technique is applied to a corresponding luma block.

In yet another example, if sub-pel precision IntraTMP mode is used to code the luma block, the sub-pel parameter is skipped for block copy for the chroma block, e.g., only the integer part of the luma BV derived by IntraTMP is used. For example, video encoder 200 or video decoder 300 may skip the sub-pel parameter for a chroma block copy and only use the integer part of the luma BV derived by IntraTMP if sub-pel precision IntraTMP mode is used to code the corresponding luma block.

In yet another example, if sub-pel precision IntraTMP mode is used to code the luma block, the sub-pel parameter is skipped for block copy for the chroma block if the block vector points to an invalid area (e.g., an area outside of a picture boundary, an area that is not yet coded, etc.). Then only the integer part of the luma BV derived by IntraTMP is used. For example, video encoder 200 or video decoder 300 may skip the sub-pel parameter for a chroma block copy if sub-pel precision IntraTMP mode is used to code the corresponding luma block if the block vector points to an invalid area.

Figure 11:
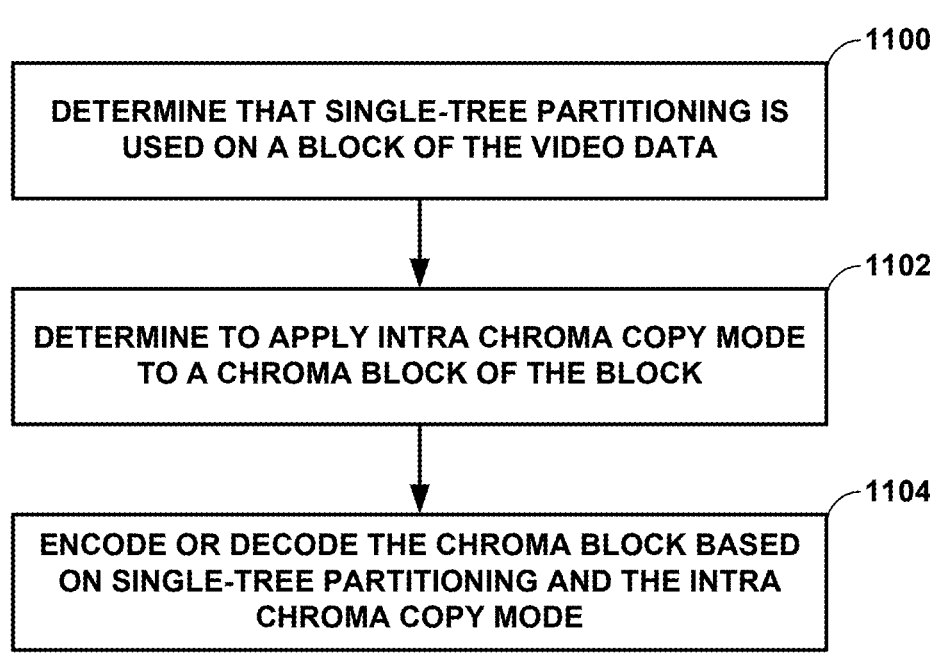
FIG. 11 is a flowchart illustrating example chroma component coding techniques according to one or more aspects of this disclosure.

FIG. 11 is a flowchart illustrating example chroma component coding techniques according to one or more aspects of this disclosure. Video encoder 200 or video decoder 300 may determine that single-tree block partitioning is used on a block of the video data (1100). For examples, video encoder 200 may determine to utilize single-tree block partitioning on a block of video data. Video decoder 300 may determine to utilize single-tree block partitioning on the block, for example, because video encoder 200 used single-tree block partitioning on the block.

Video encoder 200 or video decoder 300 may apply an intra chroma copy mode to a chroma block of the block (1102). For example, video encoder 200 or video decoder 300 may use intra chroma copy mode on the chroma block. The intra chroma copy mode may be a block copy mode similar to intra block copy. For example, the intra chroma copy mode may be a DBV mode. For example, video encoder 200 or video decoder 300 may use a luma block vector from a corresponding luma block of the block of video data for the chroma block when applying the intra chroma copy mode.

Video encoder 200 or video decoder 300 may encode or decode the chroma block based on single-tree block partitioning and the intra chroma copy mode (1104). For example, video encoder 200 may encode the chroma block using single-tree partitioning and the intra chroma copy mode. Video decoder 300 may decode the chroma block using single-tree partitioning and the intra chroma copy mode.

In some examples, the intra chroma copy mode is a DBV mode. In some examples, prior to applying the intra chroma copy mode to the chroma block, video encoder 200 or video decoder 300 may determine that a luma block of the block has a block vector, the luma block being co-located with the chroma block. In some examples, applying the intra chroma copy mode to the chroma block is at least partially based on the luma block having the block vector. In some examples, video encoder 200 may signal or video decoder 300 may parse a high level syntax element indicative of whether intra chroma copy mode is used. As used herein parsing includes determining a value of a syntax element. In this case, the value of the syntax element is indicative of whether intra chroma copy mode is used.

In some examples, as part of determining that the luma block has a block vector, video encoder 200 or video decoder 300 may determine that the luma block is coded using intra template matching prediction (IntraTMP) mode or intra block copy (IBC) mode. In some examples, video encoder 200 may signal or video decoder 300 may parse a DBV mode flag indicative of DBV mode being used.

In some examples, prior to applying the intra chroma copy mode to the chroma block, video encoder 200 or video decoder 300 may determine that a chroma coding mode for the chroma block includes a chroma derived mode (DM) mode. In such examples, applying the intra chroma copy mode to the chroma block is at least partially based on the chroma coding mode comprising the DM mode.

In some examples, the block is a first block, and the chroma block is a first chroma block. In some examples, video encoder 200 or video decoder 300 may determine that single-tree block partitioning is used on a second block of the video data. In some examples, video encoder 200 or video decoder 300 may determine that a luma block of the second block has a block vector, the luma block being co-located with a second chroma block of the second block. In some examples, based on single-tree block partitioning being used on the second block and the luma block having a block vector, video encoder 200 or video decoder 300 may disable regular intra prediction modes. In some examples, video encoder 200 or video decoder 300 may apply one of DBV mode or a cross-component prediction mode to the second chroma block. The cross-component prediction mode may include a mode that is used to predict chroma samples based on corresponding luma samples. For example, the corresponding luma samples may be luma samples from the luma block that correspond with chroma samples from the second chroma block.

In some examples, video encoder 200 or video decoder 300 may determine to encode or decode a luma block of the video data using intra template matching prediction (IntraTMP) fusion mode. In some examples, video encoder 200 or video decoder 300 may, based on the determination to encode or decode the luma block using IntraTMP fusion mode, blend a same set of block vectors used for the luma block for a corresponding chroma block of the video data in a direct block vector mode to generate blended block vectors. In some examples, video encoder 200 or video decoder 300 may encode or decode the corresponding chroma block based on the blended block vectors.

In some examples, video encoder 200 or video decoder 300 may determine a linear filter to apply to a luma block of the video data. In some examples, video encoder 200 or video decoder 300 may apply the linear filter to a direct block vector of a corresponding chroma block.

In some examples, video encoder 200 or video decoder 300 may determine to apply a first linear filter to a luma block of the video data. In some examples, video encoder 200 or video decoder 300 may determine a second linear filter to apply to a direct block vector of a corresponding chroma block. In such examples, determining the second linear filter includes determining a least mean squared error of chroma samples between a reference template identified by the direct block vector and a current template.

In some examples, video encoder 200 or video decoder 300 may determine to apply a filter to a luma block of the video data. In such examples, video encoder 200 or video decoder 300 may, based on the determination to apply a filter to the luma block, refrain from applying a filter to a corresponding chroma block of the video data.

In some examples, video encoder 200 or video decoder 300 may determine that a luma block of the video data has a plurality of block vectors. In some examples, video encoder 200 or video decoder 300 may, based on the luma block having the plurality of block vectors, select a single block vector for use in coding a corresponding chroma block. In some examples, the single block vector includes a block vector stored in list 0 or a block vector used for the luma block having a lowest template matching cost.

In some examples, video encoder 200 or video decoder 300 may determine to use sub-pel precision IntraTMP mode to encode or decode a luma block of the video data. In some examples, video encoder 200 or video decoder 300 may, based on the determination to use the sub-pel precision IntraTMP mode to encode or decode the luma block, use only an integer portion of a luma block vector derived through the sub-pel precision IntraTMP mode for a corresponding chroma block of the video data.

In some examples, video encoder 200 or video decoder 300 may determine to use sub-pel precision intra template matching prediction (IntraTMP) mode to encode or decode a luma block of the video data. In some examples, video encoder 200 or video decoder 300 may determine that a block vector derived through the IntraTMP mode points to an invalid area. In some examples, video encoder 200 or video decoder 300 may, based on the determination to use the sub-pel precision IntraTMP mode to encode or decode the luma block and the block vector pointing to an invalid area, using only an integer portion of a luma block vector derived through the IntraTMP mode for a corresponding chroma block of the video data.

Figure 12:
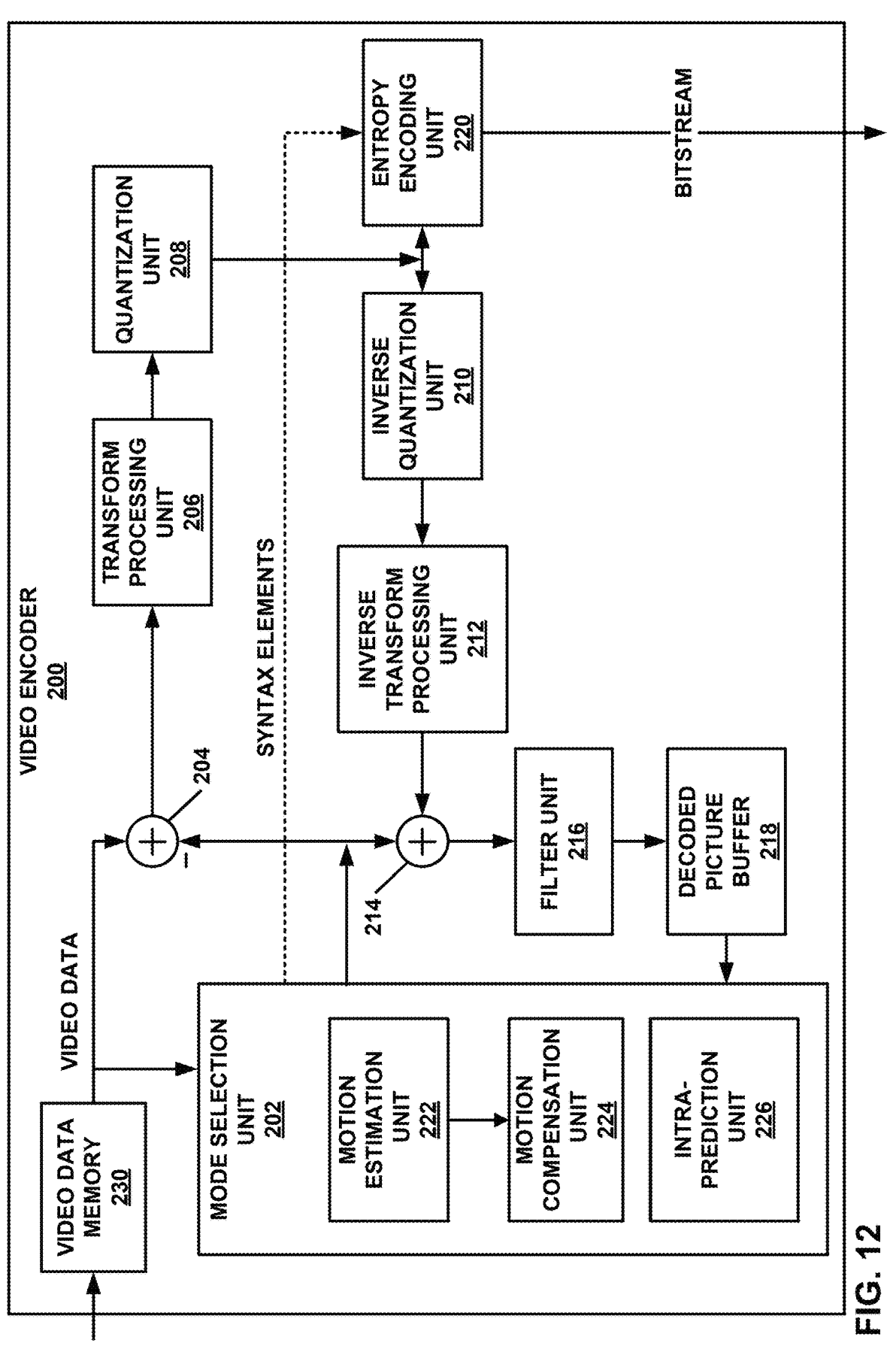
FIG. 12 is a block diagram illustrating an example video encoder that may perform the techniques of this disclosure.

FIG. 12 is a block diagram illustrating an example video encoder 200 that may perform the techniques of this disclosure. FIG. 12 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 12, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 12 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify an MV and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to a determine that single-tree block partitioning is used on a block of the video data; apply an intra chroma copy mode to a chroma block of the block; and encode the chroma block based on single-tree block partitioning and the intra chroma copy mode.

Figure 13:
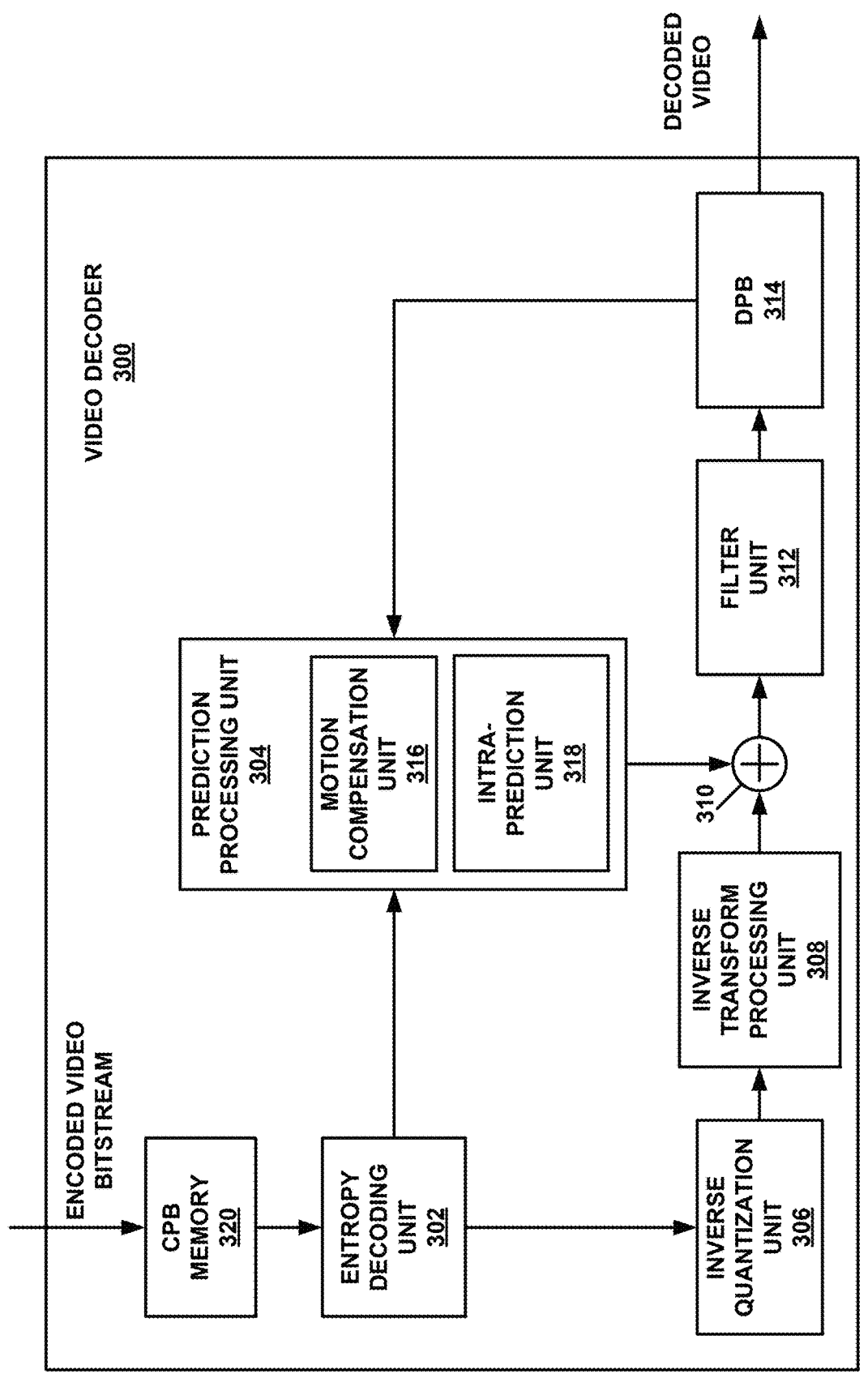
FIG. 13 is a block diagram illustrating an example video decoder that may perform the techniques of this disclosure.

FIG. 13 is a block diagram illustrating an example video decoder 300 that may perform the techniques of this disclosure. FIG. 13 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 13, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 13 are illustrated to assist with understanding the operations performed by video decoder 300. The units may be implemented as fixed-function circuits, programmable circuits, or a combination thereof. Similar to FIG. 12, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 12).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 12). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to encode video data including a memory configured to store video data, and one or more processing units implemented in circuitry and configured to a determine that single-tree block partitioning is used on a block of the video data; apply an intra chroma copy mode to a chroma block of the block; and decode the chroma block based on single-tree block partitioning and the intra chroma copy mode.

Figure 14:
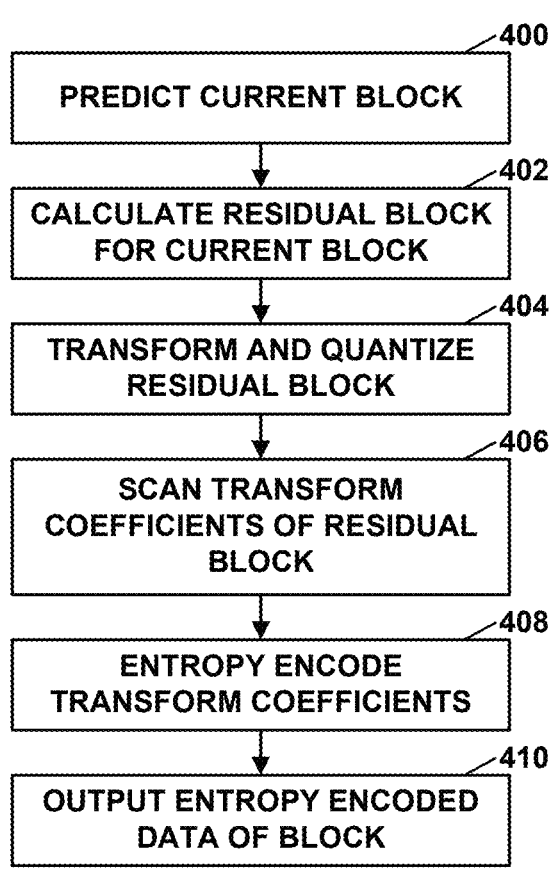
FIG. 14 is a flowchart illustrating an example method for encoding a current block in accordance with the techniques of this disclosure.

FIG. 14 is a flowchart illustrating an example method for encoding a current block in accordance with the techniques of this disclosure. The current block may be or include a current CU. Although described with respect to video encoder 200 (FIGS. 1 and 12), it should be understood that other devices may be configured to perform a method similar to that of FIG. 14.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

Figure 15:
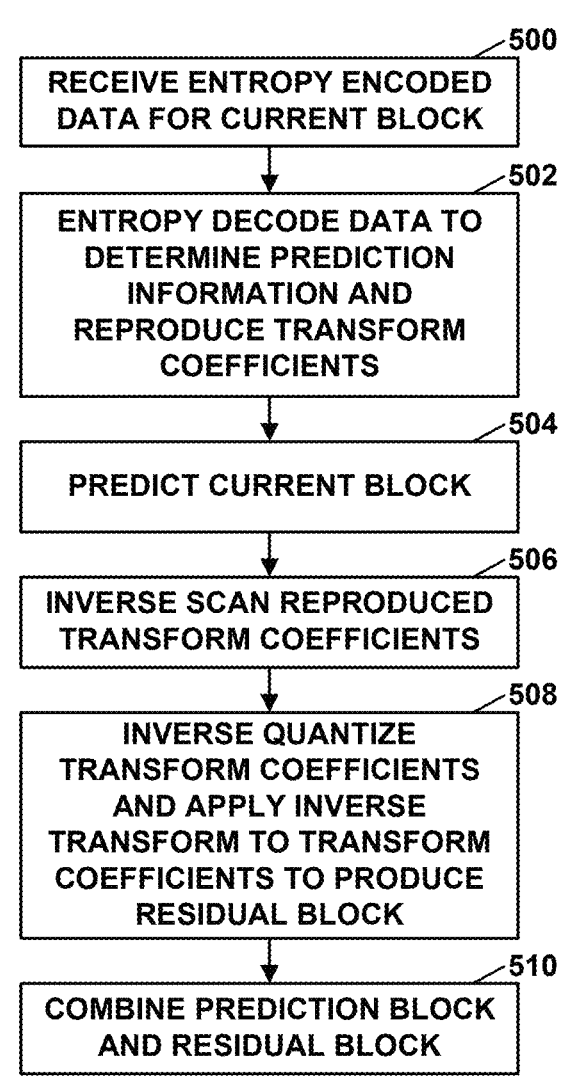
FIG. 15 is a flowchart illustrating an example method for decoding a current block in accordance with the techniques of this disclosure.

FIG. 15 is a flowchart illustrating an example method for decoding a current block of video data in accordance with the techniques of this disclosure. The current block may be or include a current CU. Although described with respect to video decoder 300 (FIGS. 1 and 13, it should be understood that other devices may be configured to perform a method similar to that of FIG. 15.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

The following numbered clauses illustrate one or more aspects of the devices and techniques described in this disclosure.

Clause 1A. A method of coding video data, the method comprising: determining that single-tree block partitioning is used on a block of the video data; applying an intra chroma copy mode to a chroma block of the block; and coding the chroma block based on single-tree block partitioning and the intra chroma copy mode.

Clause 2A. The method of clause 1A, wherein the intra chroma copy mode is a direct block vector (DBV) mode.

Clause 3A. The method of clause 1A or clause 2A, further comprising, prior to applying the intra chroma copy mode to the chroma block, determining that a luma block of the block has a block vector, wherein applying the intra chroma copy mode to the chroma block is at least partially based on the luma block of the block having the block vector.

Clause 4A. The method of clause 3A, further comprises signaling or parsing a high level syntax element indicative of whether intra chroma copy mode is used.

Clause 5A. The method of clause 3A or clause 4A, wherein determining that the luma block has a block vector comprises determining that the luma block is coded using intra template matching prediction (IntraTMP) mode or intra block copy (IBC) mode.

Clause 6A. The method of any of clauses 2A-5A, further comprising signaling or parsing a DBV mode flag indicative of DBV mode being used.

Clause 7A. The method of any of clauses 2A-5A, further comprising, prior to applying the intra chroma copy mode to the chroma block, determining that a chroma coding mode comprises a chroma derived mode (DM) mode, wherein applying the intra chroma copy mode to the chroma block is at least partially based on the chroma coding mode comprising the DM mode.

Clause 8A. The method of clause 2A, further comprising, prior to applying the intra chroma copy mode to the chroma block, determining that a luma block of the block is coded using intra template matching prediction (IntraTMP) mode or intra block copy (IBC) mode, wherein applying the intra chroma copy mode to the chroma block is based on the luma block being coded using IntraTMP mode or IBC mode.

Clause 9A. The method of clause 1A or clause 2A, wherein the block is a first block, and the chroma block is a first chroma block, further comprising: determining that single-tree block partitioning is used on a second block of the video data; determining that a luma block of the second block has a block vector; based on single-tree block partitioning being used on the second block and the luma block having a block vector, disabling regular intra prediction modes; and applying one of DBV mode or a cross-component prediction mode to a second chroma block of the second block.

Clause 10A. The method of clause 9A, wherein the cross-component prediction mode comprises a mode that predicts chroma samples based on corresponding luma samples.

Clause 11A. A method of coding video data, the method comprising: determining to code a luma block of the video data using intra template matching prediction (IntraTMP) fusion mode; based on the determination to code the luma block using IntraTMP fusion mode, blending a same set of block vectors used for the luma block for a corresponding chroma block of the video data in a direct block vector mode; and coding the corresponding chroma block based on the blended block vectors.

Clause 12A. The method of any of clauses 1A-11A, further comprising: determining a linear filter to apply to a luma block of the video data; and applying the linear filter to a direct block vector of a corresponding chroma block.

Clause 13A. The method of any of clauses 1A-11A, further comprising: determining to apply a first linear filter to a luma block of the video data; and determining a second linear filter to apply to a direct block vector of a corresponding chroma block, wherein determining the second linear filter comprises determining a least mean squared error of chroma samples between a reference template identified by the direct block vector and a current template.

Clause 14A. The method of any of clauses 1A-11A, further comprising: determining to apply a filter to a luma block of the video data; and based on the determination to apply a filter to the luma block, refraining from applying a filter to a corresponding chroma block of the video data.

Clause 15A. The method of any of clauses 1A-14A, further comprising: determining that a luma block of the video data has a plurality of block vectors; and based on the luma block having the plurality of block vectors, selecting a single block vector for a corresponding chroma block.

Clause 16A. The method of clause 15A, wherein the single block vector comprises a block vector stored in list 0 or a block vector used for the luma block having a lowest template matching cost.

Clause 17A. The method of any of clauses 1A-16A, further comprising: determining to use sub-pel precision intra template matching prediction (IntraTMP) mode to code a luma block of the video data; and based on the determination to use the sub-pel precision IntraTMP mode to code the luma block, using only an integer portion of a block vector derived through the IntraTMP mode for a corresponding chroma block of the video data.

Clause 18A. The method of any of clauses 1A-16A, further comprising: determining to use sub-pel precision intra template matching prediction (IntraTMP) mode to code a luma block of the video data; determining that a block vector derived through the IntraTMP mode points to an invalid area; and based on the determination to use the sub-pel precision IntraTMP mode to code the luma block and the block vector pointing to an invalid area, using only an integer portion of a block vector derived through the IntraTMP mode for a corresponding chroma block of the video data.

Clause 19A. The method of any of clauses 1A-18A, wherein coding comprises decoding.

Clause 20A. The method of any of clauses 1A-19A, wherein coding comprises encoding.

Clause 21A. A device for coding video data, the device comprising one or more means for performing the method of any of clauses 1A-20A.

Clause 22A. The device of clause 21A, wherein the one or more means comprise one or more processors implemented in circuitry.

Clause 23A. The device of any of clauses 21A or 22A, further comprising a memory to store the video data.

Clause 24A. The device of any of clauses 21A-23A, further comprising a display configured to display decoded video data.

Clause 25A. The device of any of clauses 21A-24A, wherein the device comprises one or more of a camera, a computer, a mobile device, a broadcast receiver device, or a set-top box.

Clause 26A. The device of any of clauses 21A-25A, wherein the device comprises a video decoder.

Clause 27A. The device of any of clauses 21A-26A, wherein the device comprises a video encoder.

Clause 28A. A computer-readable storage medium having stored thereon instructions that, when executed, cause one or more processors to perform the method of any of clauses 1A-20A.

Clause 1B. A method of encoding or decoding video data, the method comprising: determining that single-tree block partitioning is used on a block of the video data; applying an intra chroma copy mode to a chroma block of the block; and encoding or decoding the chroma block based on single-tree block partitioning and the intra chroma copy mode.

Clause 2B. The method of clause 1B, wherein the intra chroma copy mode is a direct block vector (DBV) mode.

Clause 3B. The method of clause 1B or clause 2B, further comprising, prior to applying the intra chroma copy mode to the chroma block, determining that a luma block of the block has a block vector, the luma block being co-located with the chroma block, wherein applying the intra chroma copy mode to the chroma block is at least partially based on the luma block having the block vector.

Clause 4B. The method of clause 3B, further comprises signaling or parsing a high level syntax element indicative of whether intra chroma copy mode is used.

Clause 5B. The method of clause 3B or clause 4B, wherein determining that the luma block has a block vector comprises determining that the luma block is coded using intra template matching prediction (IntraTMP) mode or intra block copy (IBC) mode.

Clause 6B. The method of any of clauses 2B-5B, further comprising signaling or parsing a DBV mode flag indicative of DBV mode being used.

Clause 7B. The method of any of clauses 2B-5B, further comprising, prior to applying the intra chroma copy mode to the chroma block, determining that a chroma coding mode for the chroma block comprises a chroma derived mode (DM) mode, wherein applying the intra chroma copy mode to the chroma block is at least partially based on the chroma coding mode comprising the DM mode.

Clause 8B. The method of clause 1B or clause 2B, wherein the block is a first block, and the chroma block is a first chroma block, further comprising: determining that single-tree block partitioning is used on a second block of the video data; determining that a luma block of the second block has a block vector, the luma block being co-located with a second chroma block of the second block; based on single-tree block partitioning being used on the second block and the luma block having a block vector, disabling regular intra prediction modes; and applying one of DBV mode or a cross-component prediction mode to the second chroma block, wherein the cross-component prediction mode comprises a mode that is used to predict chroma samples based on corresponding luma samples.

Clause 9B. The method of clause 1B or clause 2B, wherein method further comprises: determining to encode or decode a luma block of the video data using intra template matching prediction (IntraTMP) fusion mode; based on the determination to encode or decode the luma block using IntraTMP fusion mode, blending a same set of block vectors used for the luma block for a corresponding chroma block of the video data in a direct block vector mode to generate blended block vectors; and encoding or decoding the corresponding chroma block based on the blended block vectors.

Clause 10B. The method of any of clauses 1B-9B, further comprising: determining a linear filter to apply to a luma block of the video data; and applying the linear filter to a direct block vector of a corresponding chroma block.

Clause 11B. The method of any of clauses 1B-9B, further comprising: determining to apply a first linear filter to a luma block of the video data; and determining a second linear filter to apply to a direct block vector of a corresponding chroma block, wherein determining the second linear filter comprises determining a least mean squared error of chroma samples between a reference template identified by the direct block vector and a current template.

Clause 12B. The method of any of clauses 1B-9B, further comprising: Determining to apply a filter to a luma block of the video data; and based on the determination to apply a filter to the luma block, refraining from applying a filter to a corresponding chroma block of the video data.

Clause 13B. The method of any of clauses 1B-12B, further comprising: determining that a luma block of the video data has a plurality of block vectors; and based on the luma block having the plurality of block vectors, selecting a single block vector for use in coding a corresponding chroma block.

Clause 14B. The method of clause 13B, wherein the single block vector comprises a block vector stored in list 0 or a block vector used for the luma block having a lowest template matching cost.

Clause 15B. The method of any of clauses 1B-14B, further comprising: determining to use sub-pel precision intra template matching prediction (IntraTMP) mode to encode or decode a luma block of the video data; and based on the determination to use the sub-pel precision IntraTMP mode to encode or decode the luma block, using only an integer portion of a luma block vector derived through the sub-pel precision IntraTMP mode for a corresponding chroma block of the video data.

Clause 16B. The method of any of clauses 1B-14B, further comprising: determining to use sub-pel precision intra template matching prediction (IntraTMP) mode to encode or decode a luma block of the video data; determining that a block vector derived through the IntraTMP mode points to an invalid area; and based on the determination to use the sub-pel precision IntraTMP mode to encode or decode the luma block and the block vector pointing to an invalid area, using only an integer portion of a luma block vector derived through the IntraTMP mode for a corresponding chroma block of the video data.

Clause 17B. A device for encoding or decoding video data, the device comprising: one or more memories configured to store the video data; and one or more processors in communication with the one or more memories and configured to: determine that single-tree block partitioning is used on a block of the video data; apply an intra chroma copy mode to a chroma block of the block; and encode or decode the chroma block based on single-tree block partitioning and the intra chroma copy mode.

Clause 18B. The device for encoding or decoding video data of clause 17B, wherein the device further comprises: a camera configured to capture the video data; and a video encoder, wherein the one or more processors are configured to encode the chroma block.

Clause 19B. The device for encoding or decoding video data of clause 17B or claim 18B, wherein the device further comprises: a display configured to display decoded video data; and a video decoder, wherein the one or more processors are configured to decode the chroma block.

Clause 20B. A device for encoding or decoding video data, the device comprising: means for determining that single-tree block partitioning is used on a block of the video data; means for applying an intra chroma copy mode to a chroma block of the block; and means for encoding or decoding the chroma block based on single-tree block partitioning and the intra chroma copy mode.

Clause 21B. A computer-readable storage medium is encoded with instructions that, when executed, cause one or more programmable processors to determine that single-tree block partitioning is used on a block of the video data; apply an intra chroma copy mode to a chroma block of the block; and encode or decode the chroma block based on single-tree block partitioning and the intra chroma copy mode.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:
   determining that single-tree block partitioning is used on a first block of the video data;
   applying an intra chroma copy mode to a first chroma block of the first block;
   encoding or decoding the first chroma block based on single-tree block partitioning and the intra chroma copy mode;
   determining that single-tree block partitioning is used on a second block of the video data;
   determining that a second luma block of the second block has a block vector, the second luma block being co-located with a second chroma block of the second block;
   based on single-tree block partitioning being used on the second block and the second luma block having a block vector, disabling regular intra prediction modes; and
   based on single-tree block partitioning being used on the second block and the second luma block having a block vector, applying one of DBV mode or a cross-component prediction mode to the second chroma block, wherein the cross-component prediction mode comprises a mode that is used to predict chroma samples based on corresponding luma samples.

2. The method of claim 1, wherein the intra chroma copy mode is a direct block vector (DBV) mode.

3. The method of claim 1, wherein the block vector is a second block vector, the method further comprising, prior to applying the intra chroma copy mode to the first chroma block, determining that a first luma block of the first block has a first block vector, the first luma block being co-located with the first chroma block, wherein applying the intra chroma copy mode to the first chroma block is at least partially based on the first luma block having the first block vector.

4. The method of claim 3, further comprises signaling or parsing a high level syntax element indicative of whether intra chroma copy mode is used.

5. The method of claim 3, wherein determining that the first luma block has a first block vector comprises determining that the first luma block is coded using intra template matching prediction (IntraTMP) mode or intra block copy (IBC) mode.

6. The method of any of claim 2, further comprising signaling or parsing a DBV mode flag indicative of DBV mode being used.

7. The method of claim 2, further comprising, prior to applying the intra chroma copy mode to the first chroma block, determining that a chroma coding mode for the first chroma block comprises a chroma derived mode (DM) mode, wherein applying the intra chroma copy mode to the first chroma block is at least partially based on the chroma coding mode comprising the DM mode.

8. The method of claim 1, wherein method further comprises:
   determining to encode or decode a third luma block of the video data using intra template matching prediction (IntraTMP) fusion mode;
   based on the determination to encode or decode the third luma block using IntraTMP fusion mode, blending a same set of block vectors used for the third luma block for a corresponding chroma block of the video data in a direct block vector mode to generate blended block vectors; and
   encoding or decoding the corresponding chroma block based on the blended block vectors.

9. The method of claim 1, further comprising:
   determining a linear filter to apply to a third luma block of the video data; and
   applying the linear filter to a direct block vector of a corresponding chroma block.

10. The method of claim 1, further comprising:
    determining to apply a first linear filter to a third luma block of the video data; and
    determining a second linear filter to apply to a direct block vector of a corresponding chroma block, wherein determining the second linear filter comprises determining a least mean squared error of chroma samples between a reference template identified by the direct block vector and a current template.

11. The method of claim 1, further comprising:
    determining to apply a filter to a third luma block of the video data; and
    based on the determination to apply a filter to the third luma block, refraining from applying a filter to a corresponding chroma block of the video data.

12. The method of claim 1, further comprising:
    determining that a third luma block of the video data has a plurality of block vectors; and

based on the third luma block having the plurality of block vectors, selecting a single block vector for use in coding a corresponding chroma block.

13. The method of claim 12, wherein the block vector is a second block vector, and wherein the single block vector comprises a third block vector stored in list 0 or a fourth block vector used for the third luma block having a lowest template matching cost.

14. The method of claim 1, further comprising:
determining to use sub-pel precision intra template matching prediction (IntraTMP) mode to encode or decode a third luma block of the video data; and
based on the determination to use the sub-pel precision IntraTMP mode to encode or decode the third luma block, using only an integer portion of a luma block vector derived through the sub-pel precision IntraTMP mode for a corresponding chroma block of the video data.

15. The method of claim 1, wherein the block vector is a second block vector, the method further comprising:
determining to use sub-pel precision intra template matching prediction (IntraTMP) mode to encode or decode a third luma block of the video data;
determining that a third block vector derived through the IntraTMP mode points to an invalid area; and
based on the determination to use the sub-pel precision IntraTMP mode to encode or decode the third luma block and the third block vector pointing to an invalid area, using only an integer portion of a luma block vector derived through the IntraTMP mode for a corresponding chroma block of the video data.

16. A device for encoding or decoding video data, the device comprising:
one or more memories configured to store the video data; and
one or more processors in communication with the one or more memories and configured to:
determine that single-tree block partitioning is used on a first block of the video data;
apply an intra chroma copy mode to a first chroma block of the first block;
encode or decode the first chroma block based on single-tree block partitioning and the intra chroma copy mode;
determine that single-tree block partitioning is used on a second block of the video data;
determine that a second luma block of the second block has a block vector, the second luma block being co-located with a second chroma block of the second block;

44 based on single-tree block partitioning being used on the second block and the second luma block having a block vector, disable regular intra prediction modes; and
based on single-tree block partitioning being used on the second block and the second luma block having a block vector, apply one of DBV mode or a cross-component prediction mode to the second chroma block, wherein the cross-component prediction mode comprises a mode that is used to predict chroma samples based on corresponding luma samples.

17. The device for encoding or decoding video data of claim 16, wherein the device further comprises:
a camera configured to capture the video data; and
a video encoder, wherein the one or more processors are configured to encode the first chroma block.

18. The device for encoding or decoding video data of claim 16, wherein the device further comprises:
a display configured to display decoded video data; and
a video decoder, wherein the one or more processors are configured to decode the first chroma block.

19. A device for encoding or decoding video data, the device comprising:
means for determining that single-tree block partitioning is used on a first block of the video data;
means for applying an intra chroma copy mode to a first chroma block of the first block;
means for encoding or decoding the first chroma block based on single-tree block partitioning and the intra chroma copy mode;
means for determining that single-tree block partitioning is used on a second block of the video data;
means for determining that a second luma block of the second block has a block vector, the second luma block being co-located with a second chroma block of the second block;
means for disabling, based on single-tree block partitioning being used on the second block and the second luma block having a block vector, regular intra prediction modes; and
means for applying, based on single-tree block partitioning being used on the second block and the second luma block having a block vector, one of DBV mode or a cross-component prediction mode to the second chroma block, wherein the cross-component prediction mode comprises a mode that is used to predict chroma samples based on corresponding luma samples.

* * * * *